(12) United States Patent
Cass

(10) Patent No.: US 10,548,412 B2
(45) Date of Patent: Feb. 4, 2020

(54) PORTABLY SUSPENDED RETRACTABLE SHELF

(71) Applicant: DCONNECT GROUP LLC, St. Clair, MI (US)

(72) Inventor: Dan Cass, St. Clair, MI (US)

(73) Assignee: DCONNECT GROUP LLC, St. Clair, MI (US)

( * ) Notice: Subject to any disclaimer, the term of this patent is extended or adjusted under 35 U.S.C. 154(b) by 0 days.

(21) Appl. No.: 16/191,175

(22) Filed: Nov. 14, 2018

(65) Prior Publication Data

US 2019/0216227 A1 Jul. 18, 2019

Related U.S. Application Data

(63) Continuation of application No. 15/891,171, filed on Feb. 7, 2018, now Pat. No. 10,136,737, which is a
(Continued)

(51) Int. Cl.
*A47C 31/00* (2006.01)
*A47C 21/00* (2006.01)
(Continued)

(52) U.S. Cl.
CPC ............... *A47C 31/00* (2013.01); *A47C 21/00* (2013.01); *A47G 23/0225* (2013.01); *H02J 7/0042* (2013.01)

(58) Field of Classification Search
CPC ............................... H02J 7/0042; A47C 31/00
(Continued)

(56) References Cited

U.S. PATENT DOCUMENTS 4,178,701 A 12/1979 Sadler
4,286,742 A 9/1981 Pellegrino
(Continued)

FOREIGN PATENT DOCUMENTS

JP 5700198 B2 4/2015

OTHER PUBLICATIONS

International Search Report and Written Opinion for Int. Appl. No. PCT/US2019/043550, dated Oct. 25, 2019, 11 pp.
English Abstract of JP 5700198, Apr. 15, 2015, 1 pp.

*Primary Examiner* — Suchin Parihar
(74) *Attorney, Agent, or Firm* — James A. Sheridan; Sheridan Law, LLC

(57) ABSTRACT

There is disclosed a portably suspended retractable shelf for storing bedside items and which includes a horizontal platform having an inner portion and an outer portion. In various embodiments, the inner portion is adapted to be slidably captured between a mattress and a mattress supporting structure. At least one of the following upward-facing compartments is disposed on the outer portion of the horizontal platform and is accessible to a user on the mattress: a collapsible basin, a hanging flexible pocket, a foldable box. The compartments are collapsible for allowing the horizontal platform to be slidably retracted under the mattress. A cutout hole is configured to hold a cup or other object in a suspended configuration through the shelf. A downward-facing sliding drawer compartment of various sizes is mounted and/or supported underneath the outer portion of the shelf. A storage container extends from a leading surface of the portable suspended retractable shelf. Other embodiments are also disclosed.

20 Claims, 25 Drawing Sheets

Related U.S. Application Data continuation of application No. 15/049,394, filed on Feb. 22, 2016, now Pat. No. 9,924,805.

(60) Provisional application No. 62/134,120, filed on Mar. 17, 2017, provisional application No. 62/118,775, filed on Feb. 20, 2015.

(51) Int. Cl.
*A47G 23/02* (2006.01)
*H02J 7/00* (2006.01)

(58) Field of Classification Search
USPC .......................................................... 320/107
See application file for complete search history.

(56) References Cited

U.S. PATENT DOCUMENTS

| | | | |
|---|---|---|---|
| 4,588,382 A | 5/1986 | Peters | |
| D611,769 S | 3/2010 | Hauser | |
| 7,954,188 B2 | 6/2011 | House et al. | |
| 9,722,440 B2 | 8/2017 | Webb | |
| 2004/0261175 A1 | 12/2004 | May | |
| 2006/0220423 A1* | 10/2006 | Bergin | A47C 7/70 297/160 |
| 2007/0074345 A1 | 4/2007 | Martin | |
| 2007/0151501 A1* | 7/2007 | Burroughs | B63B 29/04 114/363 |
| 2008/0079388 A1* | 4/2008 | Sarnowsky | H02J 7/0042 320/103 |
| 2012/0201482 A1* | 8/2012 | Gawronski | A47C 7/62 383/118 |
| 2013/0291304 A1 | 11/2013 | Steinberg | |
| 2013/0305451 A1 | 11/2013 | Asuf et al. | |
| 2014/0131530 A1 | 5/2014 | Webb | |
| 2014/0319883 A1 | 10/2014 | Shively | |
| 2015/0175040 A1 | 6/2015 | Meszaros | |
| 2015/0278786 A1 | 10/2015 | Ruggiero | |
| 2016/0007735 A1 | 1/2016 | Gallup | |
| 2016/0059992 A1* | 3/2016 | Pierre-Pipkin | A47C 7/62 220/500 |
| 2016/0121772 A1* | 5/2016 | Stecko | B60N 3/002 108/25 |
| 2016/0143448 A1 | 5/2016 | Jackson | |
| 2016/0190838 A1 | 6/2016 | Webb | |
| 2016/0236604 A1 | 8/2016 | Parlow | |
| 2016/0276865 A1 | 9/2016 | Pike | |
| 2017/0214197 A1 | 7/2017 | Suri | |
| 2018/0154986 A1* | 6/2018 | Vogel | B63B 1/121 |
| 2018/0090894 A1 | 8/2018 | Suri | |

* cited by examiner ize

PORTABLY SUSPENDED RETRACTABLE SHELF

DOMESTIC PRIORITY CLAIM

This application is a Continuation of U.S. patent application Ser. No. 15/891,171, filed Feb. 7, 2018 by Dan Cass for "PORTABLY SUSPENDED RETRACTABLE SHELF", which will issue Nov. 27, 2018 as U.S. Pat. No. 10,136,737, which is a Continuation of U.S. patent application Ser. No. 15/049,394, filed Feb. 22, 2016 by Dan Cass for "PORTABLY SUSPENDED RETRACTABLE SHELF", which issued Mar. 27, 2018 as U.S. Pat. No. 9,924,805, which claims the benefit under 35 U.S.C. 119 (e) of U.S. Provisional Patent Application No. 62/118,775, filed Feb. 20, 2015 by Dan Cass for "PORTABLY SUSPENDED RETRACTABLE SHELF" and U.S. Provisional Patent Application No. 62/134,120, filed Mar. 17, 2015 by Dan Cass for "PORTABLY SUSPENDED RETRACTABLE SHELF".

The above-identified patent applications are hereby incorporated herein by reference.

BACKGROUND

An increasing number of small personal items need a temporary or permanent storage location near a user on a bed, couch, or chair. Users often desire personal items such as MP3 players, keys, smart phones, PDAs, beverages, books, watches, reading glasses, and jewelry to be close at hand. Yet, conventional furniture like end tables or nightstands may be expensive, or may take up too much room or be unavailable, such as in a college dorm, efficiency apartment, or hotel room.

Various solutions to bedside storage of personal items have been proposed. For example, U.S. Pat. No. 7,954,188 ("Furniture Attachment System and Methods of Use") teaches a planar support tucked under a mattress and supporting a vertical member alongside the box springs for strapping a gun, flashlight, or lamp next to the bed. Unfortunately, the items may be hard to reach for a user on the mattress. Further, the proposed straps or compartments may damage delicate items such as glasses, and may not accommodate beverage containers or cups.

In another example, U.S. Pat. Application No. US 2004/0261175 ("Sundries Caddy for Furniture") teaches a horizontal planar member captured by a cushion and supporting a vertical member having a receptacle with an open upper end. However, the caddy is a permanent structure and may get in the way, such as when making the bed.

In further example, U.S. Pat. Application No. US 2013/0291304 ("Portable Bedside Container") teaches a horizontal platform inserted between a mattress and box spring and supporting upward-pointing storage bins or pouches along the side of and substantially flush with the top of the mattress. Again, the storage compartments may be rigid and may get in the way of the user, or interfere with making the bed. Further, no particular solution is proposed for accommodating beverage containers, nor is there a convenient place for keys or jewelry.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is disclosed a portably suspended retractable shelf for storing bedside items and which may comprise a horizontal platform having an inner portion and an outer portion. The inner portion may be adapted to be slidably captured between a mattress and a mattress supporting structure. At least one of the following upward-facing compartments may be disposed on the outer portion of the horizontal platform and be accessible to a user on the mattress: a rigid container, a collapsible basin, a drink cup, a hanging flexible pocket, and a foldable box. In some embodiments, the compartments may be collapsible or removed for allowing the horizontal platform to be slidably retracted under the mattress.

In another embodiment, there is disclosed a method for portably suspending a retractable shelf for storing bedside items and which may comprise extending a horizontal platform from a bed or cushioned furniture. The horizontal platform may have an inner portion and an outer portion. The method may further comprise slidably capturing the inner portion between a mattress and a mattress supporting structure. The method may further comprise disposing at least one of the following upward-facing compartments on the outer portion of the horizontal platform for accessing the bedside items by a user on the mattress: a rigid container, a collapsible basin, a drink cup, a hanging flexible pocket, and a foldable box. The method may further comprise retracting the horizontal platform under the mattress when not in use, wherein the compartments may be collapsible or removed for allowing the horizontal platform to be slidably retracted under the mattress.

In another embodiment, there is disclosed a portably suspended retractable shelf for storing bedside items and which may comprise a horizontal platform having an inner portion and an outer portion. The inner portion may be adapted to be slidably captured between a mattress and a mattress supporting structure. At least one of the following upward-facing compartments may be disposed on the outer portion of the horizontal platform and be accessible to a user on the mattress: a collapsible basin, a hanging flexible pocket, a foldable box, a cutout hole, a drinking glass, a cup, a mug, and a beverage-retention object. The compartments may be collapsible or removed for allowing the horizontal platform to be slidably retracted under the mattress. At least one of the following downward-facing compartments may be disposed on the outer portion of the horizontal platform and be accessible to a user on the mattress: a sliding drawer, a compartment, a foldable box, and a box organizer. The compartments may be selectably detached or removed for allowing the horizontal platform to be slidably retracted under the mattress.

In another embodiment, there is disclosed a portably suspended retractable shelf for storing items proximate to a cushion member includes a horizontal platform with a carrying location associated therewith. The horizontal platform has an inner portion and an outer portion, with the inner portion adapted to be slidably captured relative to the cushion member. The carrying location is associated with the outer portion of the horizontal platform, the carrying location being configured for carrying one of a drink cup, an upper-facing compartment, an LED light, and an electronics charging station.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. Additionally, it is to be understood that any of various features disclosed herein may be used in any combination and are not limited to use in the express context shown (i.e., features may be mixed and matched, as appreciated by one skilled in the art). The following detailed description is, therefore, not to be taken in a limiting sense.

When elements are referred to as being "connected" or "coupled," the elements can be directly connected or coupled together or one or more intervening elements may also be present. In contrast, when elements are referred to as being "directly connected" or "directly coupled," there are no intervening elements present.

As may be appreciated, based on the disclosure, there exists a need in the art for a portable shelf that can be suspended under a mattress or cushion and be retracted and/or removed when not in use. Further, there exists a need in the art for a portable shelf storing personal, bedside items within easy reach of a user. And, there exists a need in the art for a portably suspended shelf that accommodates beverage containers and a wide variety of personal items such as smart phones, books, jewelry, remote controls, keys, and reading glasses. Further, there exists a need in the art for a portable shelf disposed with a collapsible cup holder or another storage receiving component that can be removed from a bed and utilized as an eating tray or to support a laptop computer.

Figure 1A:
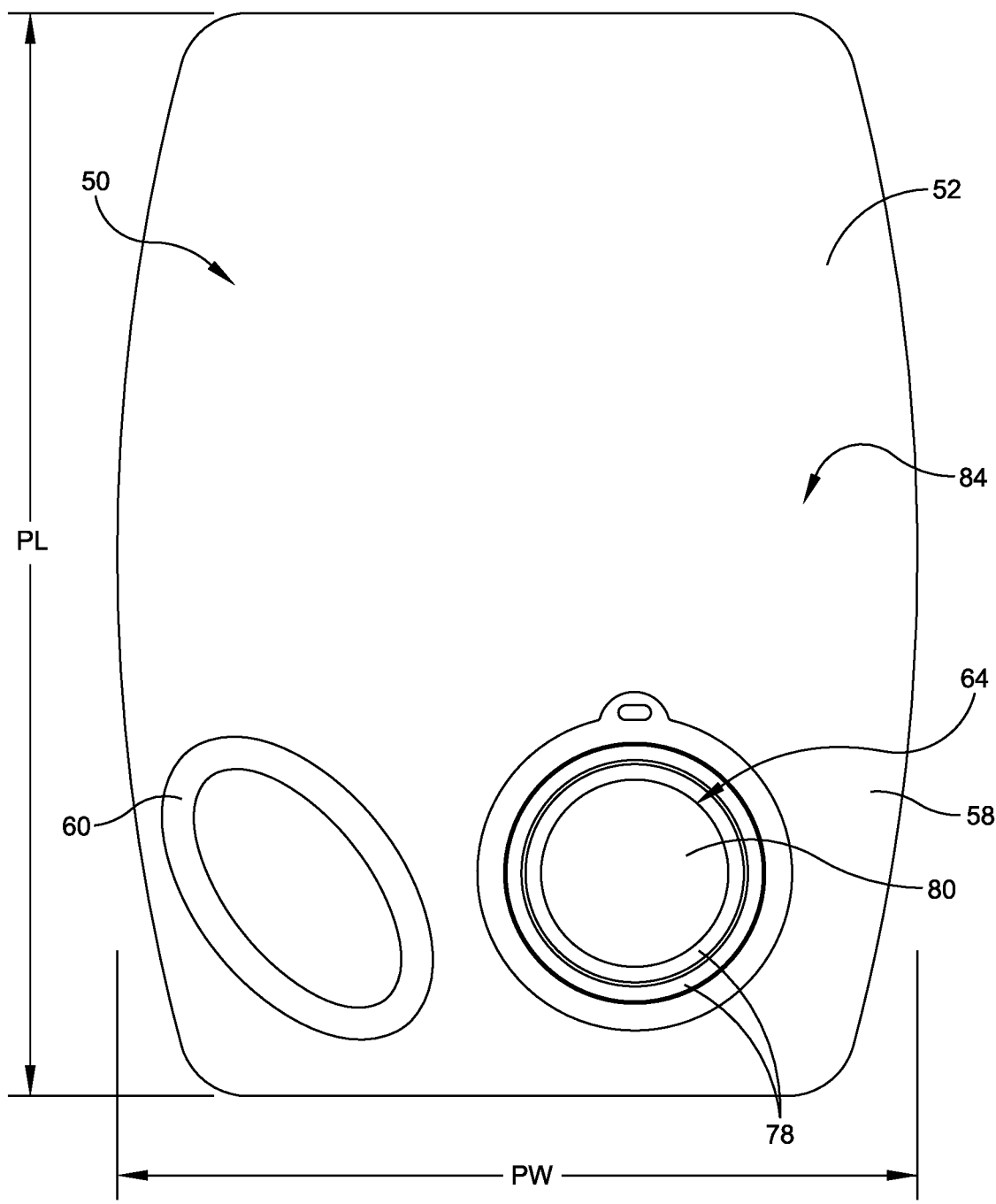
FIGS. 1a-1c illustrate a mock-up of a portable shelf with a flexible pocket and a collapsible cup holder, in accordance with an embodiment of the present disclosure.
Figure 1B:
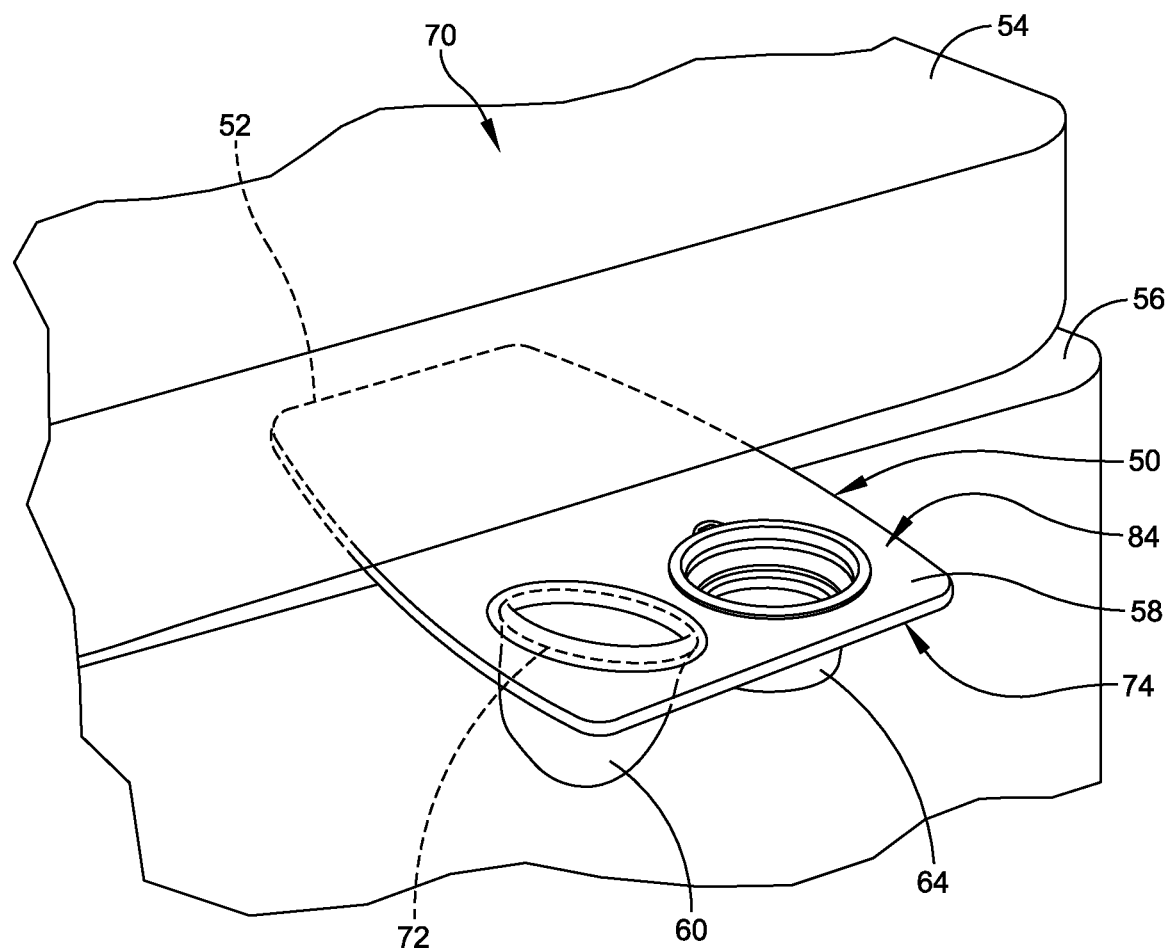
Figure 1C:
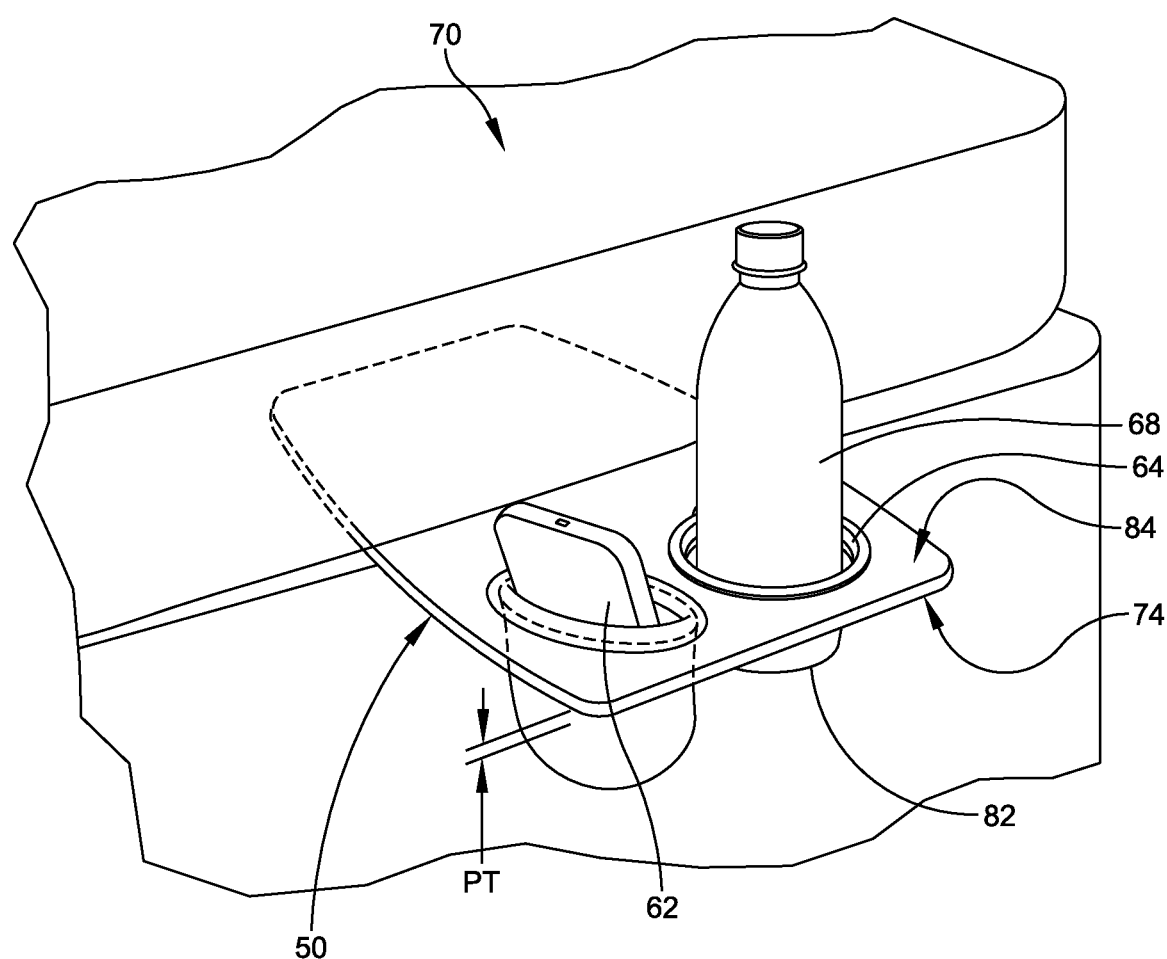

In an embodiment, referring to FIGS. 1a-1c, a horizontal platform 50 may have an inner portion 52 captured between a mattress 54 and a mattress supporting structure 56 like a box springs. The platform 50 may have an outer portion 58 disposed with a flexible pocket 60 for holding a cell phone 62 and a collapsible basin 64 for holding a glass or cup (not shown), beverage container 68, or one or more other items. The inner portion 52 may be sized and dimensioned such that the horizontal platform 50 is securely and frictionally captured while allowing the platform 50 to be slidably retracted into or extended out from the bed 70, as defined, in part, by the mattress 54 and the box springs 56. The amount of the platform 50 which serves as the inner portion 52 may vary from use to use, but it is to be understood that a sufficient area of the platform 50 at any given time is to be used as the inner portion 52 so as to provide a sufficient fulcrum/cantilever support for the remainder of the platform 50 and any objects carried thereon.

The platform 50 may be made of any material that is sufficiently strong, stiff, and durable enough for the present use environment, such as, but not limited to, bamboo, particle board, wood, a plastic-wood composite material, a laminated material, metal, fiberglass, composites, polymers, copolymers, carbon fiber, or plexiglass. It is to be understood that the platform 50, at least on the inner portion 52 thereof, may incorporate a textured or an otherwise improved-grip surface (not illustrated) to aid in its retention within the bed 70. The platform 50 member may further incorporate stiffening members (not shown), such as ridges on one side thereof. The shape of the platform 50 may be rectangular with rounded corners. Alternately, platform shapes (not shown) may be rectangular, square, oval, a trapezium, a pentagon, a triangle, or any shape that creates a supporting base for personal items. In addition, the horizontal platform 50 may serve as a ledge for temporarily holding a pair of socks while the user is putting them on.

Continuing with FIGS. 1a-1c, in an embodiment, the flexible pocket 60 may be a sleeve or a sock, and one or more pockets 60 may be mounted to the rim (not shown) of a pocket hole 72 in the platform 50 and may hang below the bottom surface 74 of the platform 50. An overlay ring (not shown) may retain the flexible pocket 60 and be covered by fabric, and may attach the pocket 60 by the ring attaching to the horizontal platform 50. Alternately, the pocket 60 may hang from a collapsible rim (not shown) protruding above the platform 50, wherein the collapsible rim is a top edge of a collapsible basin or cylinder, or a protruding rim may be a coiled spring to be depressed prior to the platform being retracted into the mattress. The flexible pocket 60 may be, by way of example, made of cloth, a plastic insert, a shear fabric, leather, or a collapsible silicone receptacle. The flexible pocket 60 may also be made of a material that will not harm the lenses of reading glasses or the touch screen of a smart phone. The shape of the pocket hole 72 may be square, rectangular, circular, or oval, and the flexible pocket may be interchangeable and shaped to accommodate a specific size and shape of items, such as needed for accommodating a particular size of electronics device.

Referring still to FIGS. 1a-1c, in an embodiment, the collapsible basin 64 may be a colander, bowl or cup holder (as are commercially available), and one or more basins 64 may be mounted each to the rim (not shown) of a basin hole 76 in the platform, and may be expanded to extend below the horizontal platform 50 when ready to hold a cup or beverage container 68. The collapsible basin 64 may be fabricated of concentric rings 78 of rigid and flexible horizontal sections, which may allow slidable movement between the rings 78 so as to permit the basin 64 to be extended by pushing down on the topside 80 of the basin 64. The extended basin 64 may provide a depth of one inch or more for securely retaining a beverage container 68 or any other element which may fit therein and be adequately supported thereby. In an embodiment, the user may collapse the basin 64 by pushing up on the bottom side 82 of the basin 64 and thereby limit the amount that the basin 64 extends beyond the top and bottom surfaces 84, 74 of the platform 50 to less than approximately ½ inch (not expressly indicated in the drawings). In another embodiment, the basin 64 may collapse such that it is flush with or inside the top and bottom surfaces 84, 74 of the platform. The collapsible basin 64 may be made of silicone, an FDA approved food-compliant material, fabric, a mesh screen, or any means that allows vertical folding of the basin or cup holder 64 to allow retraction of the platform beneath the mattress 54 or a cushion (not shown here). The shape of the basin 64 and the corresponding basin hole 76 may be square, rectangular, circular, or oval. It is to be understood that it is advantageous that the shape and size of the basin 64 and the corresponding basin hole 76 should mate sufficiently well to permit the basin 64 to extend through the basin hole 76 but yet still be able to be retained by the edges of the basin hole 76. Further, it is to be understood that a basin hole 76 may be used to receive other objects (e.g., LED light, charger unit, a beverage cup (directly), etc.) besides a collapsible basin 64, as will be described later in various sections of the specification.

Continuing with FIGS. 1a-1c, in an embodiment, a given inner portion 52 of the horizontal platform 50 may be slidably retracted underneath the mattress to reduce the length of the outer portion 58 of the platform 50 that is available for storing personal items. Alternately, the platform may be completely or nearly hidden/retracted (not shown) under the mattress 54 by removing personal items and collapsing the collapsible basin 64 to a nearly flat structure. The flexible pocket 60 may be sized and fabricated so that it folds up close to the outer surfaces 84 and/or 74 of the horizontal platform 50, and/or may be adapted to retract into the pocket hole 72, thereby allowing the platform 50 to be retracted underneath the mattress 54. The friction of the surface of the inner portion 52 of the platform 50 and the dimensions of the platform 50 may be optimized so that the leverage of the length/area (not labelled) of the inner portion 52 of the platform 50 and the weight of the mattress 54 allow the mattress 54 and mattress supporting structure 56 to securely capture the horizontal platform 50 while allowing slidable extension and retraction thereof relative to the bed 70.

The platform width PW of the horizontal platform 50 may, in one variation, range from approximately 4 inches to approximately 24 inches, and the platform length PL may, in one variation, range from approximately 12 inches to approximately 24 inches from the inner portion to the outer portion. Other platform widths PW and platform lengths PL outside of these ranges could, in some instances be possible. As a general rule, the platform length PL must be large enough to provide for a sufficient inner portion 52 to facilitate support of the outer portion 58 and the items being carried thereby. The outer portion 58 of the platform length PL should be large enough to provide adequate support area for any bedside items that it is to carry but should not be so large so as to create a trip hazard for someone getting out of the bed 70.

Referring still to FIGS. 1a-1c, in an embodiment, the elasticity and dimensions of the portable shelf 50 may be chosen to allow the cushioning provided by the mattress 54 and the mattress-supporting structure 56 to be substantially unaltered by the portable shelf 50. For example, a flexible composite or plastic material may be used to construct a horizontal platform 50 that substantially transfers non-planar pressures in the mattress 54 through to the mattress supporting structure 56 such that the user of the mattress 54 cannot tell (e.g., via increased firmness) that the portable shelf 50 is present.

In embodiments not shown, referring to FIGS. 1a-1c, the mattress 54 may be the cushion of a chair or sofa, and the mattress supporting structure 56 may be a box spring, a bed frame, a bunk bed board or base, a chair base, or a sofa base. In an even broader sense, though, in terms of the current and previous examples, the mattress or a cushion of a chair or sofa may be considered to be the upper cushion member 168 (FIG. 16b) of that given piece of furniture, and its corresponding one of a box spring, a bed frame, a bunk bed board or support, a seat base, a chair base, or a sofa base may be considered the lower cushion support member or furniture base 160. That is to say, in prior embodiments, where the bed 70 was the piece of furniture shown, it is to be understood that the mattress 54 served as the upper cushion member 168, and the mattress supporting structure 56 served as the lower cushion support member 170.

Advantageously, the portable shelf 50 may be easily adjusted in location without the use of tools by lifting up the mattress 54 and inserting the portable shelf 50 in another location within the bed 70; sliding the shelf 50 to a new location below the mattress 54; or pulling the shelf 50 out and moving it to be used with another piece of furniture. For example, the portable shelf 50 may be moved to a convenient location suspended from a couch or chair (similar to FIGS. 34b-34c) for watching a movie. Alternately, a portable shelf 50 with collapsible compartments 64 may be portably attached or integrated to permanent or existing shelving or cabinetry within a home, building structure, or an automobile armrest, automobile dashboards or center consoles, a household countertop, a restaurant table, a park bench, a church pew, a baby car seat, a baby food table or tray, an RV, a camper, a boat, or a shed. Another example, an S-type mounting bracket (or other types of supports, including, for example, an angle bracket or other supporting brace mechanism) may be used to mount a portable shelf 50 when the mattress 54 or sofa seating cushion is being held in place by a trim board. For example, boats, recreation vehicle seating, sleeping areas, children's storage beds, twin beds, and bunk beds, may have a trim board that prevents the portable shelf 50 from being captured between a mattress 54 and a mattress supporting structure 56. The S-type mounting bracket may allow the horizontal platform 50 to be mounted and used as a portable and stationary unit.

In other embodiments not shown, suction cups or sliding/guide mechanisms may be used to retractably or temporarily suspend the portable shelf 50 from a countertop, a school desk, a restaurant table, a park bench, a church pew, a recreation vehicle, a structure in a camper, a structure in a boat, or a console or dashboard in an automobile. For example, suction cups may be used to temporarily attach a top surface of a portable shelf to the underside of a kitchen cabinet for conveniently supporting personal items like a beverage container or a smart phone. A platform housing may slidably enclose a horizontal platform disposed with a flexible pocket and a collapsible basin, and the platform housing may have suction cups attaching the portable shelf to a kitchen cabinet for temporarily and inexpensively suspending additional storage compartments. In this variation, the horizontal platform may function as a drawer sliding in the platform housing. Alternately, releasable drawer guides may be installed on furniture or kitchen cabinets and may receive complementary tracks mounted to the sides of the horizontal platform for slidably suspending a portable shelf having collapsible compartments. A release lever on the drawer guide may allow the horizontal platform to be relocated easily and without tools.

Referring again to FIGS. 1a-1c, in embodiments not shown, the collapsible basin 64 and flexible pocket 60 may be attached to the outer portion 58 of the horizontal platform 50 using glue, Velcro (a hook and loop fastener), a snap-in assembly mating with a groove in the platform, mechanical fasteners, or may be otherwise bonded or molded to fit to the basin hole and pocket hole, respectively. Alternately, the platform 50 and at least one compartment (not shown with respect to FIGS. 1a-1c) may be molded as one piece, such as a recess for holding reading glasses or as a retention cup. Optionally, the shape of the horizontal platform 50 may mimic a cartoon character or other figure (FIGS. 15a-15b, where, for example, Mickey Mouse (Walt Disney Co.) is depicted), wherein some recognizable feature 86 of the figure, such as the ears for Mickey, may align with an aspect of the portable shelf 50, such as a location for receiving a collapsible cup holder or another receiver element.

Referring now to FIGS. 1a-1c, 2, and 10, in an embodiment, additional variations of the portable shelf 50 described above may include making the horizontal platform out of plastic, wood, or other structural materials, as alluded to previously. Also, as seen from FIG. 10, it may be possible to use two or more portable shelves 50 at a given time within a bed 70. As seen per one of the portable shelves 50 in FIG. 2, a handle 87 may be provided in the outer portion 58 to aid pulling of the shelf 50, especially from a retracted position. The handle 87 may, for example, be in the form of an appropriately sized and shaped through-slot proximate the free edge (not labelled) of the shelf 50, or it may be in the form of a separately attached pull mechanism (not shown).

Figure 2:
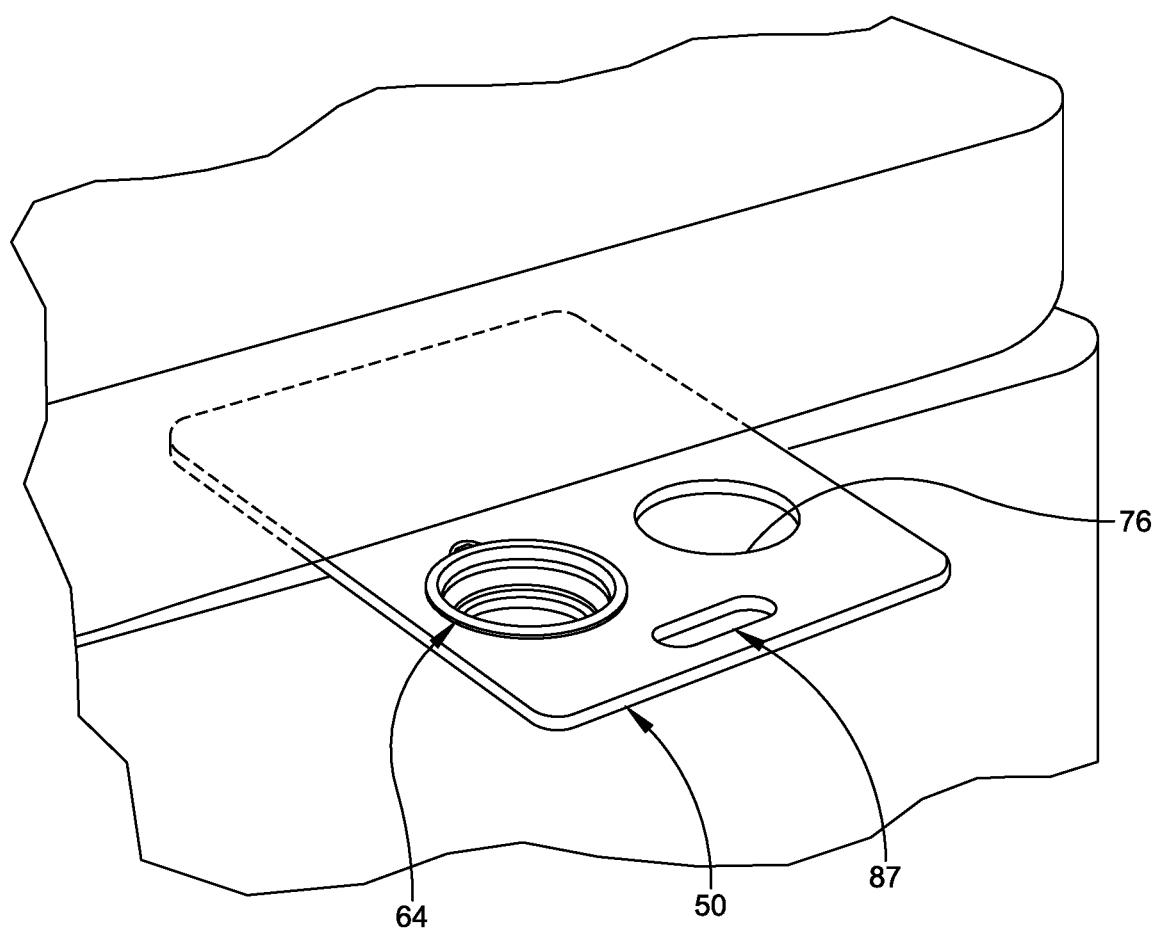
FIG. 2 illustrates a mock-up of a portable shelf and having an empty basin hole for receiving a storage member, a drink cup, an LED light, a charger unit, or other member, in accordance with an embodiment of the present disclosure.

Additionally, two basin holes 76 may be disposed side by side on a platform 50, as shown in FIG. 2, for capturing a pair of collapsible basins 64 (cup holders) or other items (e.g., storage cup, LED light, electronics charging unit, a drink cup, etc.). The thickness PT of a horizontal platform 50 may be varied to optimize stability, frictional capture by the mattress 54 and mattress supporting structure 56, and slidability. For example, a plastic cutting board material (which typically has a textured surface) may be used to fabricate the horizontal platform 50, and the thickness of the platform may range from approximately ½ inch to approximately 1 inch. Other thicknesses may be employed as dictated by a balance of design objectives.

Figure 3:
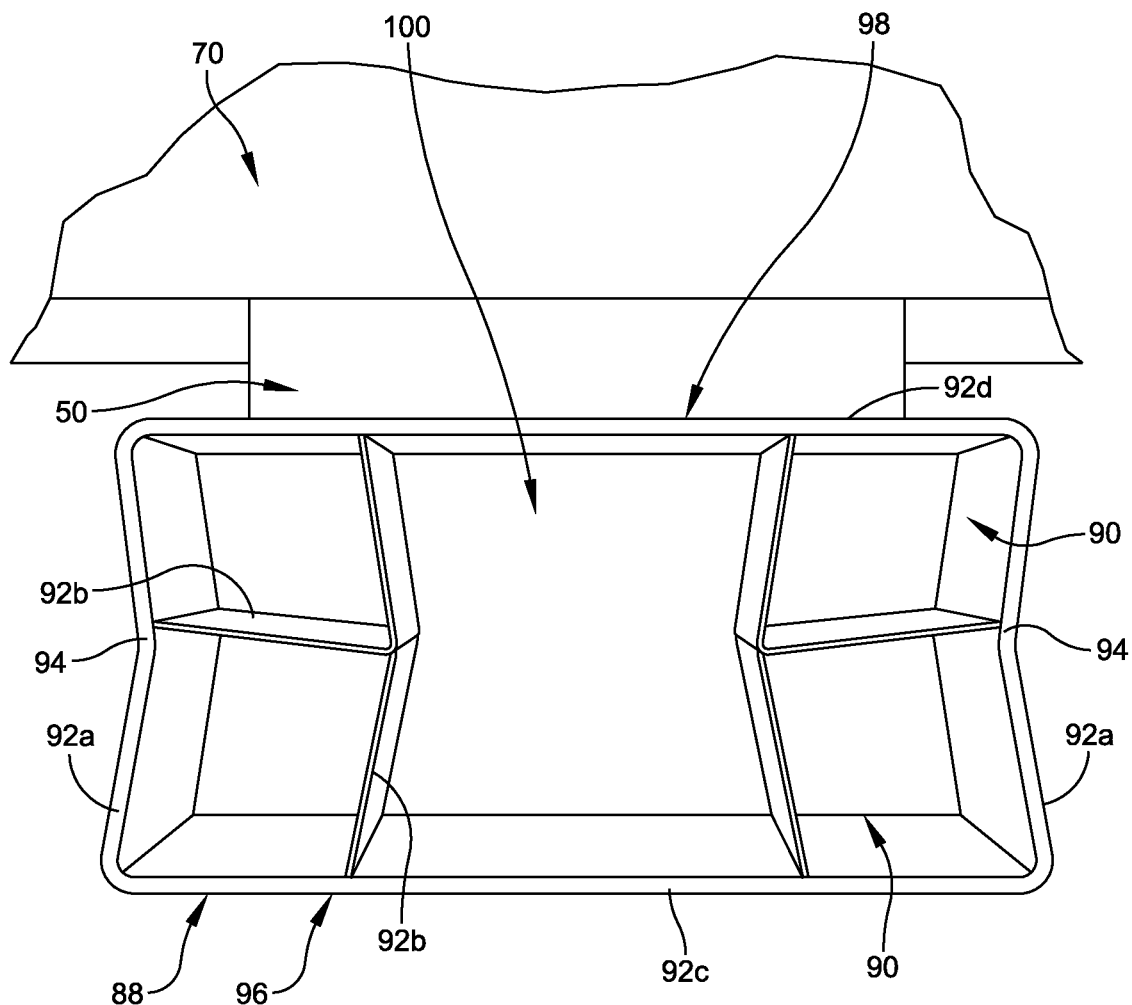
FIG. 3 illustrates a mock-up of a foldable storage box, in the form of a twill box, mounted to a sliding platform and pulled away from the mattress, in accordance with an embodiment of the present disclosure.
Figure 4A:
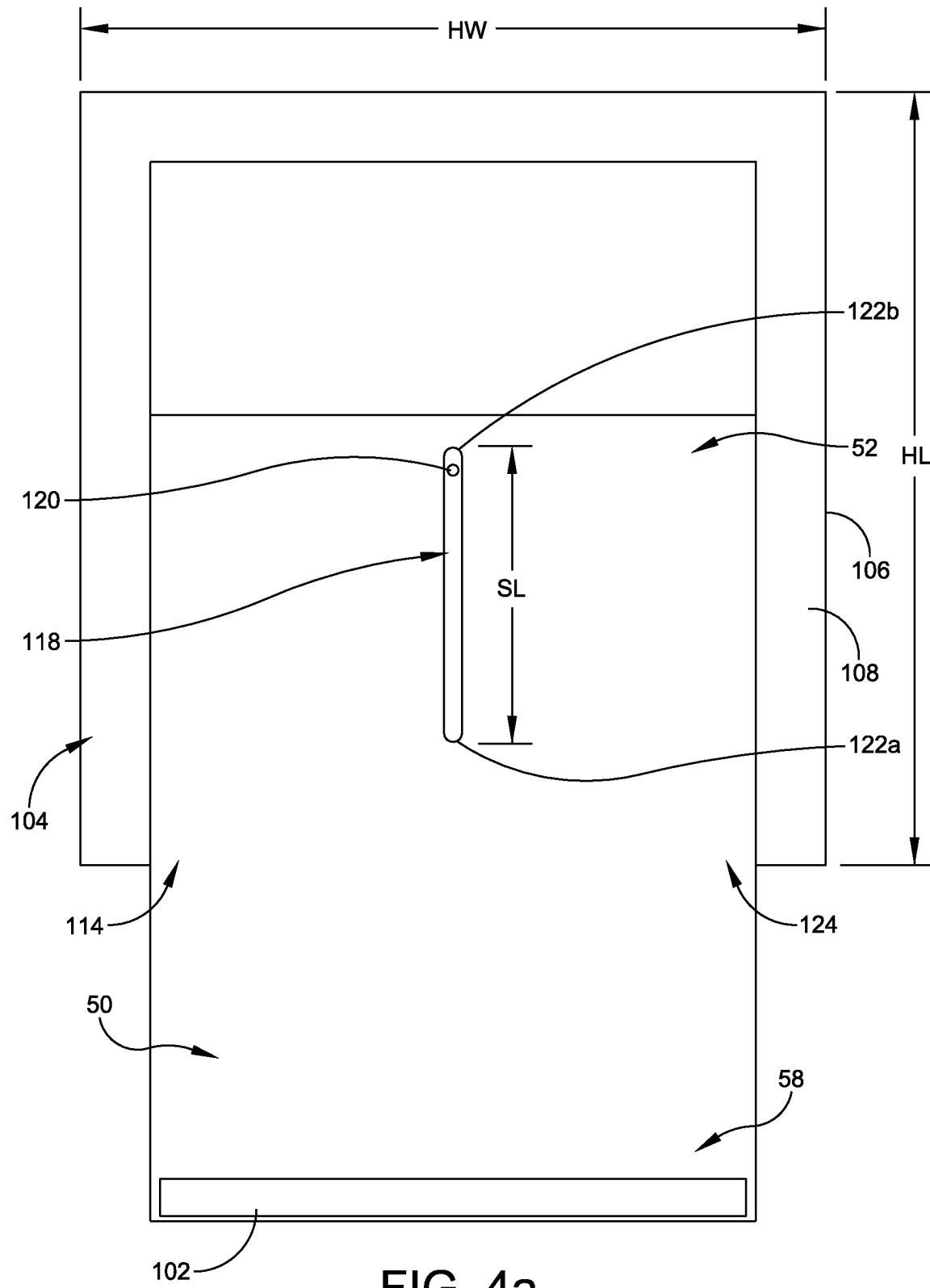
FIG. 4a illustrates a mock-up of a sliding platform lying inside an envelope housing, in accordance with an embodiment of the present disclosure.
Figure 4B:
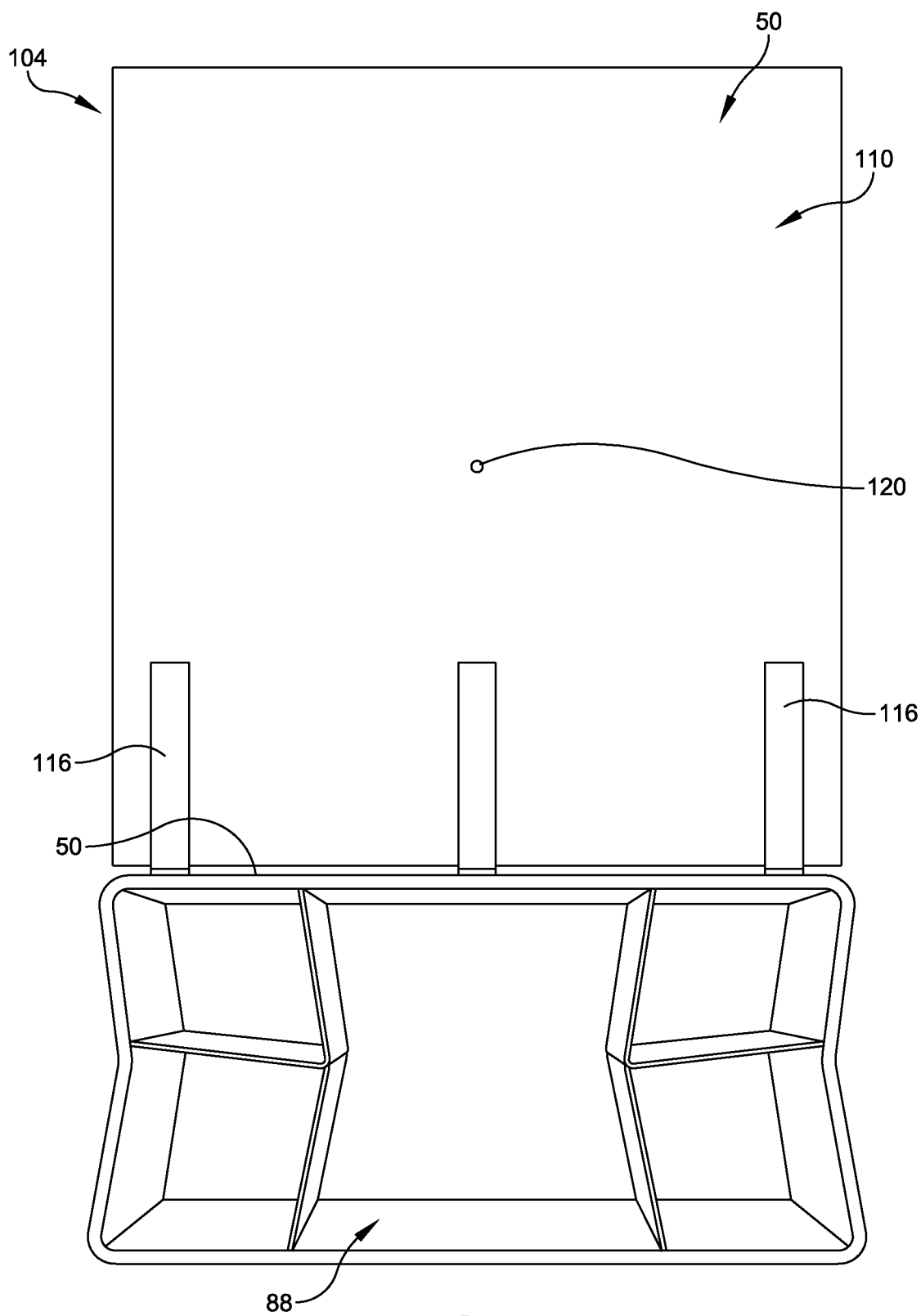
FIG. 4b illustrates a mock-up of a twill box mounted to a portable shelf with an envelope housing attached to a box bedside of the twill box, in accordance with an embodiment of the present disclosure.
Figure 5:
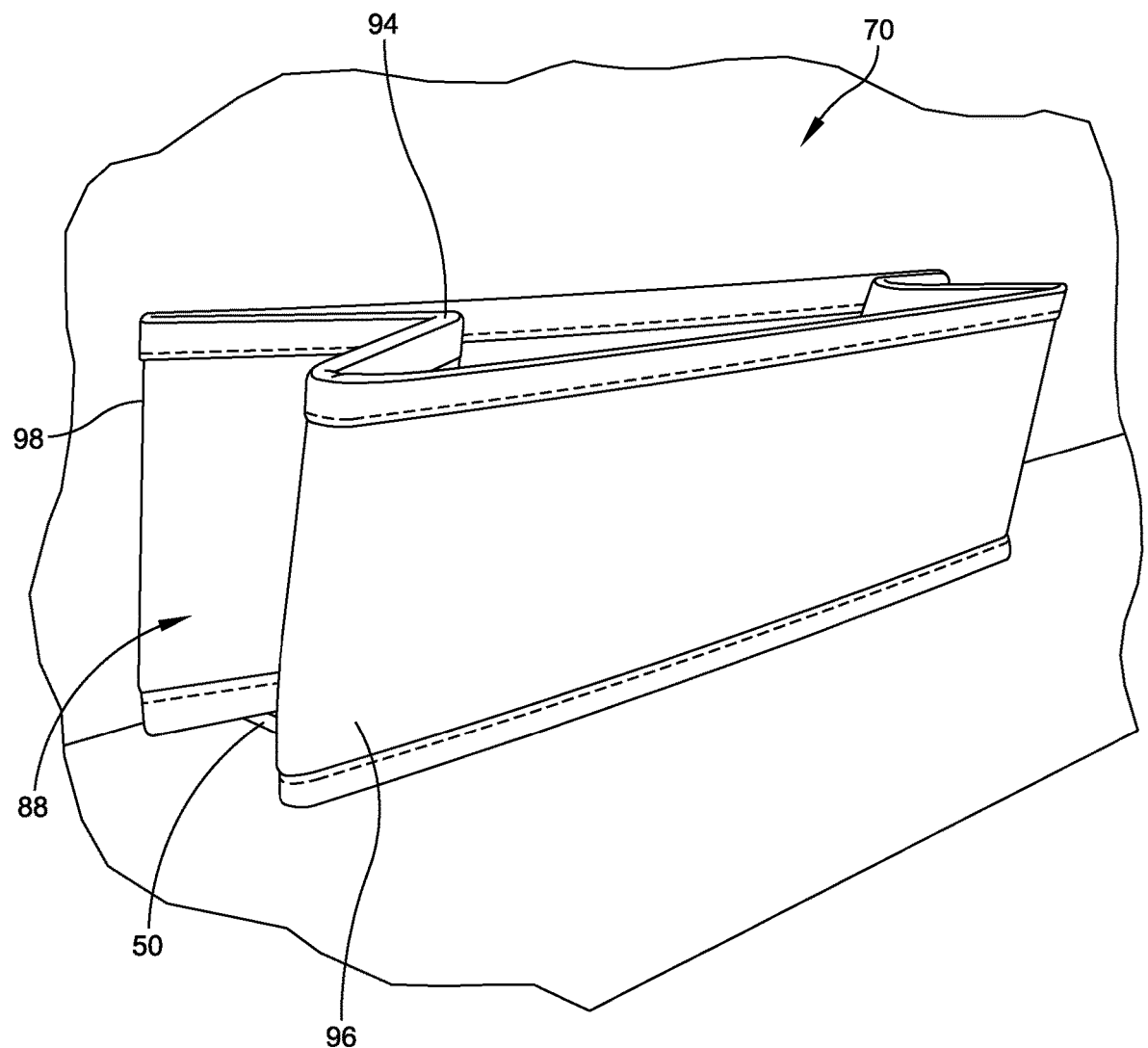
FIG. 5 illustrates a mock-up of a twill box folded against a mattress, in accordance with an embodiment of the present disclosure.

Referring to FIGS. 3-5, in an embodiment, a foldable storage box 88, as is commercially available (e.g., a twill box), with several upward-facing compartments 90 may have walls 92, including a pair of sidewalls 92a, interior walls 92b, a box front wall 92c, and a box back wall 92d, and such walls 92 may be made of twill fabric sewn around supporting stiffeners (not shown) such as paper, cardboard, plastic, or metal. The sidewalls 92a and/or the interior walls 92b forming the compartments 90 may be hinged at wall joints 94 to facilitate folding of a given storage box 88 from box room side 96 (i.e., including the box front wall 92c and being the side opposite the bed 70 and facing the room (not shown) in which the bed 70 is located) toward a box bed side 98 (i.e., including the box back wall 92d and being the side directly facing the bed 70), as the sliding horizontal platform 50 is retracted underneath a mattress 54 or cushion. An optional fabric floorboard or bottom 100 may be installed without stiffeners for collapsing easily upon folding of the sidewalls 92. The floorboard 100 may have a loop (not shown) sewn into it for pulling the foldable box 88 off the horizontal platform 50.

The foldable box 88 may be mounted to an envelope box or platform housing 104 (which will be described in more detail later) or directly to a sliding horizontal shelf 50 using a Velcro fastener 102 (FIG. 4a-4b), glue, screws, stings, rope, rivets, and or turning or locking mechanisms (the latter examples not being shown) for easy removal for cleaning/washing. To facilitate retraction, a user may crease the sides 92 of the twill box 88 in initiate hinging of the wall joints 94, and then may push the box room side 96 toward the mattress 54 to fold the box 88 and slide the platform 50 under the mattress 54. Advantageously, the foldable box 88 may be made to lie nearly flush against the mattress 54, as per FIG. 5, so it is out of the way when not in use, such as when making the bed 70. Yet, the platform 50 may be extended below (e.g., partially or fully thereunder, as can be seen in part in FIG. 5) the foldable storage box 88, when the foldable storage box 88 is deployed, in order to provide a further level of support for the foldable storage box 88. The ability to have the platform 50 be able to be moved relative to the foldable box 88 is facilitated by attaching the foldable storage box to the platform housing 104 while allowing the platform 50 to be slidably movable relative to and under the foldable storage box 88.

Additionally, other collapsible compartments 64, such as a collapsible cup holder, may be disposed on the horizontal platform 50 and next to the foldable storage box 88. Twill, in one variation, may be used in order to hide stains and creases better than other textiles or outer materials, such as a shear fabric. The inside of the foldable box 88, however, may be sewn with a sheer fabric. It is to be understood that any various fabrics or materials (e.g., plastic, elastomer, etc.) may be used in association with the foldable box 88, as warranted by the situation (e.g., decorative, washability, and/or wear purposes).

Continuing with FIGS. 3-5, in embodiments not shown, the foldable box 88 may store a variety of electronic devices such as a media (e.g., cable/TV) remote control, cell phone, iPad, MP3 player, PDA, laptop computer, hearing device, baby monitor, emergency weather radio, or two-way radio devices. In addition, the portable shelf 50, the storage cup 64 or the drink cup 148 may be augmented to support the charging of electronic devices (described later in more detail with respect to FIGS. 13a-14b) while being stored in the foldable storage box. For example, the horizontal platform 50 may be equipped with a notch or a slot (not shown here) in the front, back or side for holding a power cord, USB cord, or a charging cord to support charging mechanisms for electrical devices being stored it the foldable box 88. In addition, the portable shelf or platform 50, the storage cup 64 or the drink cup 148 may integrate electrical wiring (or other charging mechanisms, including, for example, wireless (magnetic inductive, near field radio frequency, RF chip and magnetic resonance charging mechanisms) supplying AC/DC or USB power to electrical devices being stored on the portable shelf 50, the storage cup 64 or the drink cup 148 installed in basin hole 76 to be described later with respect to FIGS. 13a-14b. For example, a power cord may couple to electrical wires embedded in the horizontal shelf which may then feed an interchangeable charging base mounted in one of the upward-facing compartments within the foldable storage box, the charging base matched to charge a cell phone or other electronic devices. Also, the same power cord feeding the horizontal shelf may feed low voltage ambient lighting to illuminate the shelf so that it can be easily located at night.

In other embodiments not shown, the storage compartments of the foldable storage box may be sized and configured to store a glass or bottle containing a beverage, eye glasses, a watch, keys, jewelry, various electronic devices, medicine containers, and other bedside items. Additionally, items such as keys, jewelry, books, electronic devices, medicine containers, and other bedside items may be stored on flat space adjacent to the foldable storage box. The shape of the foldable box may be square, rectangular, circular, oval, or an irregular polygon with hinged walls for folding.

The foldable box 88 may provide one large upward-facing compartment 90 (not expressly shown) for storing bedside items and may have walls 92 made of twill fabric sewn around supporting stiffeners (not expressly shown) such as paper, cardboard, plastic, or metal. Each of two sidewalls 92a may be vertically hinged between stiffeners to allow a user to crease in the sidewalls 92a and fold the box room side 96 toward the box bed side 98 for retracting the portable shelf 50 against a mattress 54. The foldable box 88 may be mounted to a sliding horizontal platform 50 using Velcro fasteners 102 or other means noted above. Having one upward facing compartment 90 may allow the storage of larger bedside items, like a laptop computer or iPad (not shown). Alternatively, other collapsible compartments 64, such as a collapsible cup holder, or other receptacles may be disposed on the outer portion 58 of the horizontal platform 50 on areas not occupied by the flexible box 88.

Referring now to FIGS. 4a-4b, 6a-6b, and 7, in an embodiment, a sliding horizontal platform 50 may be enclosed by a platform housing or envelope 104 having a housing outside surface 106 frictionally captured between the mattress 54 and the mattress supporting structure 56. The platform housing 104 may slidably enclose at least the inner portion 52 of the horizontal platform 50 and be configured for retraction and extension of the outer portion 58 of the portable shelf 50 (i.e., the outer portion 58 or at least some amount thereof may also be retracted into the platform housing 104). The platform housing 104 (envelope box housing) may have an envelope housing frame 108 framing an upper and lower housing members 110, 112 frictionally captured by the mattress 54 and the mattress supporting structure 56, respectively. While the platform housing 104 has been shown used with a bed 70, it is to be understood that it could be used with other types of furniture employing an upper cushion member and lower cushion support member between which the platform housing 104 may be deployed.

The two functions of sliding and capturing may be thereby separated, much like a drawer sliding in a dresser, wherein the sliding function of the portable shelf 50 may occur between the horizontal platform 50 and the platform housing 104, and the capturing function of the portable shelf 50 may occur between the platform housing 104 and the mattress 54 above and mattress supporting structure 56 below, thus permitting a more refined design. In the version shown, bed-side frame opening 114 of the platform housing frame 108 is wide enough to accommodate the sliding of the inner and outer portions 52, 58 of the horizontal platform 50 in and out thereof. However, in one variant (not shown), the inner portion 52 of the portable shelf 50 may be wider than the outer portion 58 thereof, and bed-side frame opening 114 of the platform housing frame 108 may be narrower than the inner portion 52 but at least as wide as the outer portion 58, thereby serving to prevent the inner portion 52 from being pulled too far out. The width HW of the platform housing 104 should be sufficient to accommodate the width PW of the horizontal platform 50 and, in one variation, may range up to approximately 24 inches. Likewise, the length HW of the platform housing 104 may be sized to accommodate the length of the horizontal platform in both the extended and retracted positions and, in one version, may range from approximate 12 inches to approximately 24 inches.

Referring still to FIGS. 4a-4b, 6a-6b, and 7, in an embodiment, the horizontal platform 50 may be configured with a foldable box 88 having one (not shown) or several (shown) upward-facing storage compartments 90, as described above, wherein the foldable box 88, in one variation, may be made of twill fabric sewn around supporting stiffeners such as paper, cardboard, plastic, or metal. The walls 92 forming the compartments 90 may be hinged (for example, a mechanical or another type of living hinge) at wall joints 94 to facilitate folding of a box room side 96 toward a box bed side 98 as the sliding horizontal platform 50 is retracted underneath a mattress 54 or cushion.

The foldable box 88 may be mounted to a sliding horizontal platform 50 using Velcro (FIG. 4b) or other fasteners and described above. Optionally (FIGS. 3, 4b, and 5), the box bed side 98 of the foldable box 88 may be attached to the housing outer surface 106 of the platform housing 104 for permitting the relative movement of the horizontal platform 50 therebelow. In particular, as the box room side 98 of the foldable box 88 is pulled out from the bed 70, the horizontal platform 50 may likewise be pulled out to provide support beneath the foldable box 88. It is to be understood that, though not expressly shown, the underside of the box room side 98 of the foldable box 88 could be attached, e.g., via Velcro (hook and loop fasteners), to a leading portion of the horizontal platform 50, with the box bed side 98 being attached to the platform housing 104, as shown. In attaching the foldable box 88 in this manner, pulling out of the horizontal platform 50 would also initiate expansion of the foldable box 88, and pushing the horizontal platform 50 (fully or partially) into the platform housing 104 would likewise cause the collapse of the foldable box 88. For example, three Velcro attachment members 116 may attach the box bed side 98 of the foldable box 88 to the platform housing 104. Alternately, the foldable box 88 and the platform housing 104 may be separable from one other (e.g., the case where the foldable box 88 is affixed directly to the horizontal platform 50 but not the platform housing 104), allowing the foldable box 88 to extend out from the mattress 54 by a distance greater than the perimeter/footprint of the foldable box 88, as seen in FIG. 3.

Continuing with FIGS. 4a-4b, 6a-6b, and 7, in an embodiment, a guide slot 118 in the horizontal platform 50 (sliding divider shelf) may be elongated along a guide slot length SL of the inner portion 52 of the portable shelf 50 and may mate with a guide pin 120 extending from the upper housing member 110 and/or the lower housing member 112 of the platform housing 104 (envelope box housing) for engaging and aligning the horizontal platform 50 with the platform housing 104 during extension and retraction. The guide slot 118 and guide pin 120 may limit the travel of the horizontal platform 50 via end stops 122a, 122b associated with the guide slot 118. The guide pin 120 may be a dowel. The use of a platform housing 104 with a guide slot 118 and guide pin 120 may facilitate a portable shelf 50 with a foldable box 88 whose box bed side 98 is flush against the mattress 54 when fully retracted and whose box room side 96 is folded against the box bed side 98 (separated only by the presence of any folded interior walls 92b) when retracted.

Advantageously, the portable shelf 50 may slide smoothly and uniformly perpendicularly to the mattress 50, and the sliding function may be independent of the mattress-capturing function of the platform housing 104. Additionally, the position of the horizontal platform 50 and any upward-facing compartments 90 may be reliably known by the user, even when not visible, such as during nighttime. The guide slot 118 and pin 120 may prevent the platform 50 from being accidentally pulled fully out of the platform housing 104 (enclosure). In another embodiment not shown, the guide slot 118 may be disposed on the platform housing 104 and the guide pin 120 may be disposed on the horizontal platform 50. Additionally, multiple guide slot and pin combinations may be employed to limit travel and guide the extension and retraction of the horizontal platform, thereby adding stability to the sliding process.

It is to be understood that such a slot-and-pin guidance system can be employed with any of the variants shown herein (not just for those employing a flexible box 104), so long as such variants are reasonably conducive to the use of a platform housing 104. Finally, it is to be understood that a guide pin 120 may extend from just one surface and be of a height so as to permit the dislodging of the platform 50 therefrom (e.g., by lifting and/or tipping the platform 50). Thus, the slot-and-pin guidance system need not permanently mount the platform 50 within the platform housing 104 yet can still serve to retain the platform 50 therein under regular use circumstances.

Referring still to FIGS. 4a-4b, 6a-6b, and 7, in an embodiment, the guide pin 120 may be a dowel made of wood, bamboo, plastic, composites, polymers, copolymers, plexiglass, carbon fiber or metal. The dowel may attach to one or both of the upper housing member 110 and the lower housing member 112. The dowel rod/guide pin 120 attaching to both upper and lower housing members 110, 112 may add structural support to the platform housing 104. The elasticity and dimensions of the platform housing 104 may be chosen to allow the cushioning provided by the mattress 54 and the mattress-supporting structure 56 to be substantially unaltered by the portable shelf, preferably so long as the elasticity and/or the compression afforded by the platform housing 104 is not so great so as to effectively act as brake on the sliding of the platform 50 within the platform housing 104.

For example, the elasticity and dimensions of the platform housing 104 may be chosen to substantially transfer non-planar pressures in the mattress 54 through to the mattress supporting structure 56 such that the user of the mattress 54 cannot tell that the portable shelf 50 is present. The mattress 54 may be the cushion of a chair or sofa, and the mattress supporting structure 56 may be a box spring, a bed frame, a bunk bed board or support, a chair base, or a sofa base. The portable shelf assembly 124 made of the horizontal platform 50 and the enclosing platform housing 104 may be easily adjusted in location without the use of tools by lifting up the mattress 54 and moving (via inserting or simply sliding) the portable shelf assembly 124 to another location within the bed 70 or moving it to another piece of furniture (similar to FIG. 16b). For example, the portable shelf 50 may be moved to a convenient location suspended from a couch or chair for watching a movie.

In other embodiments not shown, the platform housing 104 may be portably attached to permanent shelving or cabinetry within a home, to an automobile armrest, automobile dashboards or center consoles, a household countertop, a restaurant table, a park bench, a church pew, a baby car seat, a baby food table or tray, an RV, a camper, a boat, or a shed. For example, an S-type mounting bracket may be used to mount a portable shelf when the mattress or sofa seating cushion is being held in place by a trim board. Also, suction cups or sliding/guide mechanisms may be used to retractably or temporarily suspend the portable shelf from a countertop, a school desk, a restaurant table, a park bench, a church pew, a structure within a recreation vehicle, a structure in a camper, a structure in a boat, or a console or dashboard in an automobile. For example, suction cups may be used to temporarily attach a top surface of a portable shelf to the underside of a kitchen cabinet for conveniently supporting personal items like a beverage container or a smart phone. In another embodiment not shown, the guide slot and guide pin may be replaced with one or more drawer slides mounted between the platform housing and the horizontal platform for maintaining alignment and limiting travel. The drawer slide may have a locking mechanism for limiting travel. Thus, in the broadest sense, the slot and pin combination and/or a drawer slide are deemed to be general equivalents as both may provide a sliding guide and at least one stop for the movement of the horizontal platform relative to the platform housing.

Still referring to FIGS. 4a-4b, 6a-6b, and 7, in an embodiment, the platform housing 104 may comprise a bed-side frame opening or housing mouth 114 through which a horizontal platform 50 or at least a part thereof is configured to pass. The platform 50 and the platform housing 104, as described previously, may accommodate a guide slot and guide pin arrangement for limiting travel and guiding extension and retraction of the horizontal platform 50. In an embodiment, the housing length HL of the platform housing may be as little as approximately 1 inch (i.e., essentially enough to define an entryway for the platform 50 between the mattress 54 and the underlying mattress support 56), substantially reducing the impact of the platform housing 104 on mattress dynamics. The housing mouth 114 may provide a controlled friction enclosure for the sliding horizontal platform 50 while capturing the mattress 54 and mattress supporting structure 56. Velcro (i.e., a hook-and-loop fastener) disposed on the housing mouth 114 of a platform housing 104 may face the mattress 54 and/or mattress supporting structure 56 and may enhance the frictional capture of the portable shelf 50 by the bed 70 or furniture. A foldable box 88 may be disposed on the sliding horizontal platform 50 (e.g., attached directly thereto and/or able to sit thereon, with the horizontal platform 50 being slidable relative thereto) for holding bedside items. The length HL of the platform housing 104 may be extended partially or completely inwardly from the housing mouth 114 to more completely enclose the horizontal platform 50.

Figure 6A:
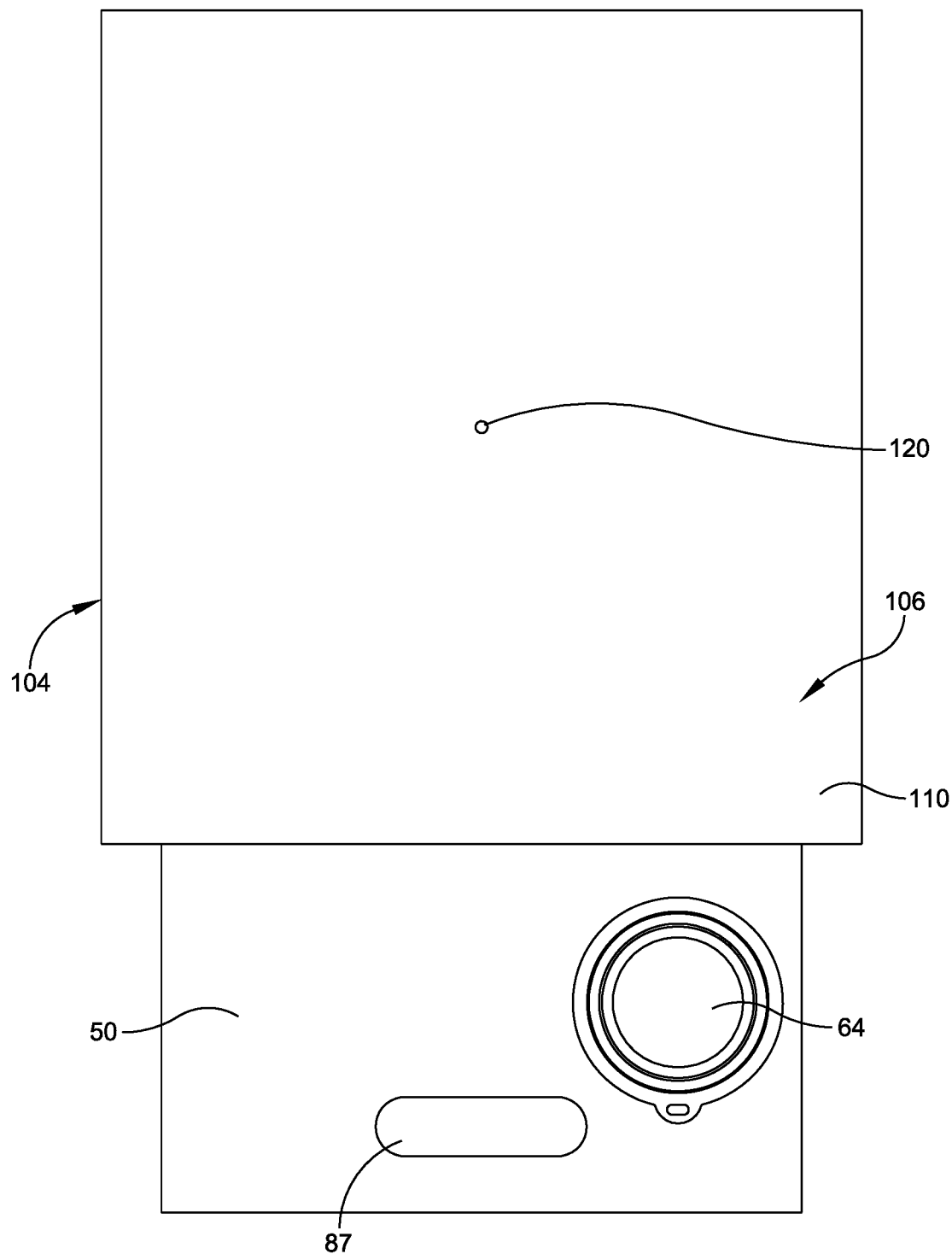
FIGS. 6a and 6b illustrate a mock-up of a sliding platform with a guide slot and enclosed by an envelope housing, in accordance with an embodiment of the present disclosure.
Figure 6B:
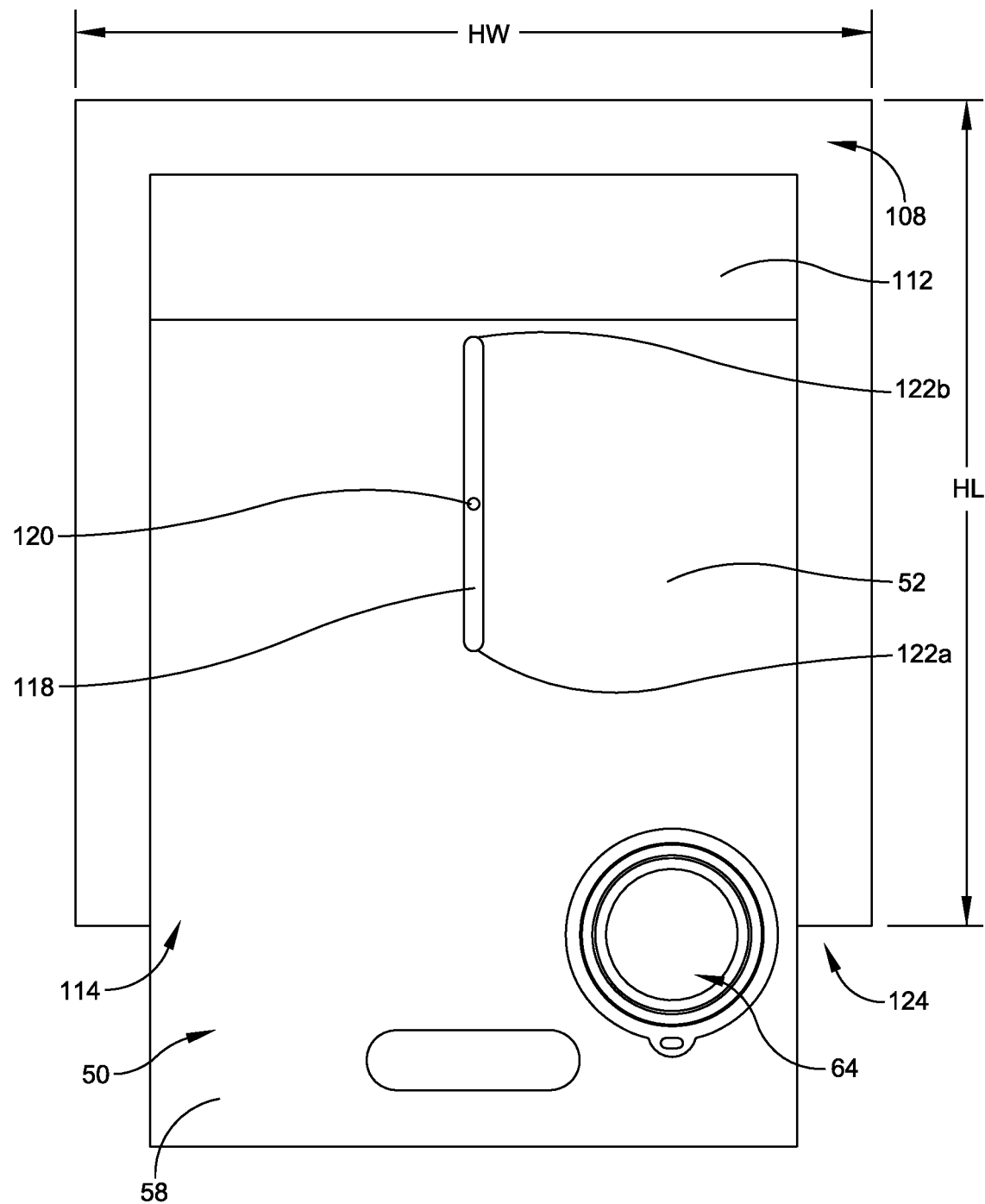
Figure 7:
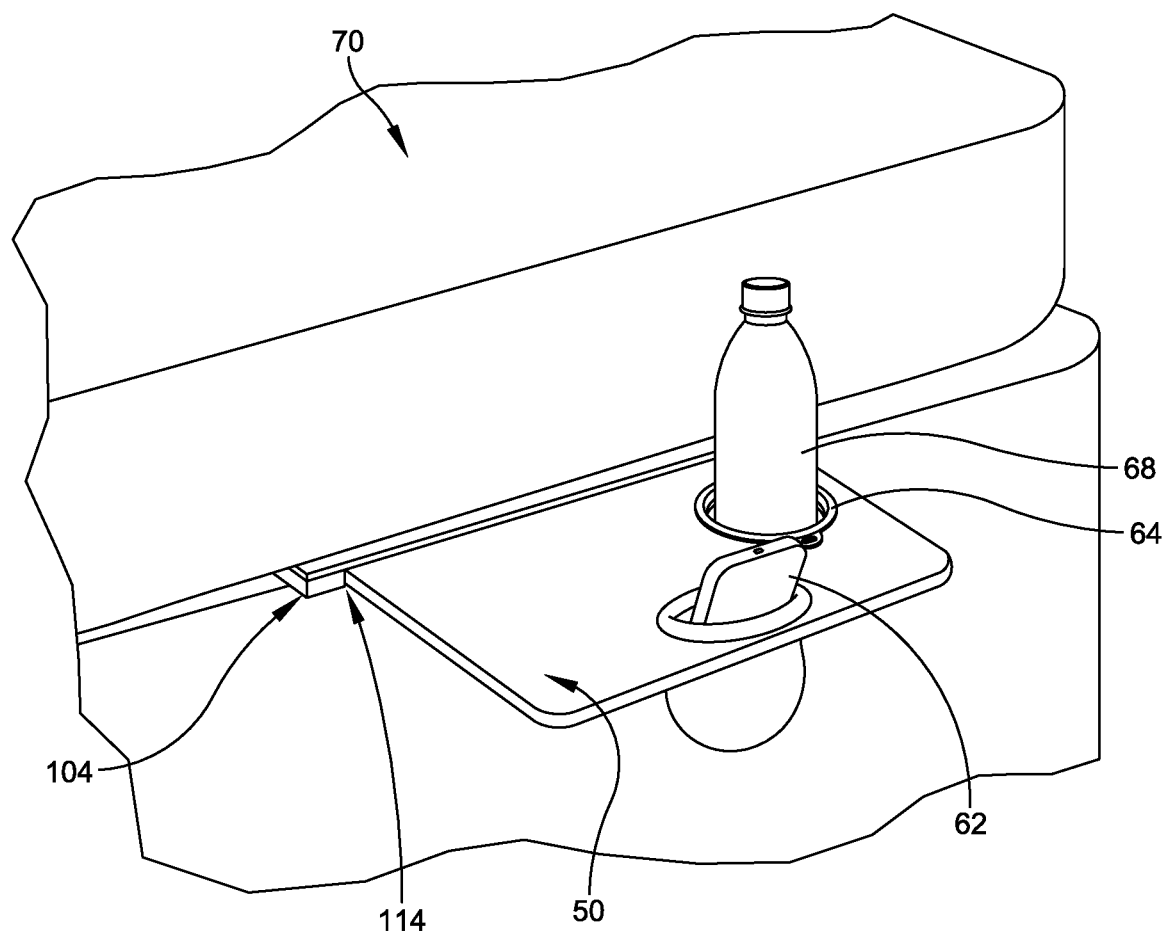
FIG. 7 illustrates a mock-up of a horizontal platform slidably suspended from a bed and captured within an envelope housing, in accordance with an embodiment of the present disclosure.

Continuing and referring to FIGS. 6a-6b, an embodiment similar to FIGS. 4a-4b is presented, and, as such, part numbering, for simplicity, has remained the same. However, where variances occur, those are described in relation to the present embodiment. A plastic horizontal platform 50 may have a guide slot 118 (dowel sliding guide) mating with a guide pin 120 (dowel) in a platform housing 104 (envelope box housing) enclosing at least a section of the horizontal platform 50. The platform housing 104 may include an envelope housing frame 108 and an upper and lower housing member 110, 112. The envelope housing frame 108 may border or frame the perimeter of platform housing 104 and serve to space the upper and lower housing members 110, 112 from one another. The upper and lower housing members 110, 112 may be captured between the mattress 54 and mattress supporting structure 56. The guide pin 120 (dowel) may attach to both upper and lower housing members 110, 112 for stabilizing the assembly. For example, the guide pin 120 may prevent the housing members 110, 112 from compressing the enclosed horizontal platform 50 and thereby prevent restricted platform movement. In an embodiment, the horizontal platform 50 may be configured with one or more collapsible compartments 64 for facilitating retraction of the horizontal platform 50 into the platform housing 104. For example, the horizontal platform 50 may be disposed with a collapsible basin 64 such as a collapsible cup holder and a hanging flexible pocket 60 for holding bedside items such as a beverage container and a cell phone.

In other embodiments not shown, a horizontal platform 50 equipped with a collapsible basin 64 or other containment receptacle may be mounted or integrated in a molded airplane tray table, a baby car seat, the armrest of a car, hunting or fishing equipment, ladder tree stands, hunting blinds, chairs and seat, or an ice fishing shanty. In addition, a sliding horizontal platform equipped with a collapsible cup holder (basin) may be slidably captured by a cushion or mattress structure of the above applications, providing a retractable and portable shelf. Alternately, a sliding horizontal platform equipped with collapsible compartments, such as a collapsible cup holder, may be enclosed by a platform housing mounted to outfit an airplane tray table, a baby car seat, the armrest of a car, hunting or fishing equipment, ladder tree stands, hunting blinds, chairs or seats, or an ice fishing shanty.

The platform 50 may be contoured and sized as a dual-purpose lapdesk 50a (FIG. 8) that is removable from suspension by the bed 70 or furniture for being positioned on the lap 126 of a user. The lapdesk 50a may be made of particle board, wood, a plastic-wood composite material, or a laminated material, as shown, or may be made of metal, plastic, fiberglass, polymers, copolymers, carbon fiber, or plexiglass (not shown). The collapsible basin 64 may be extended by pressing down on the inner/top side surface 80 of the bottom, and may be collapsed by pressing up on the outer/bottom side surface 82 of the bottom, as previously discussed. The lapdesk 50a may be further configured to carry other retention elements (e.g., a flexible pocket 60), as well. Although not expressly shown, it is to be understood that multiple variants and uses of the lapdesk 50a (e.g., as computer/smart work station and as an eating area) may be readily apparent for such a lap desk, as well as different ways for arranging a given lapdesk 50a on a user's lap 126, with such uses being considered within the scope of this disclosure.

Figure 8:
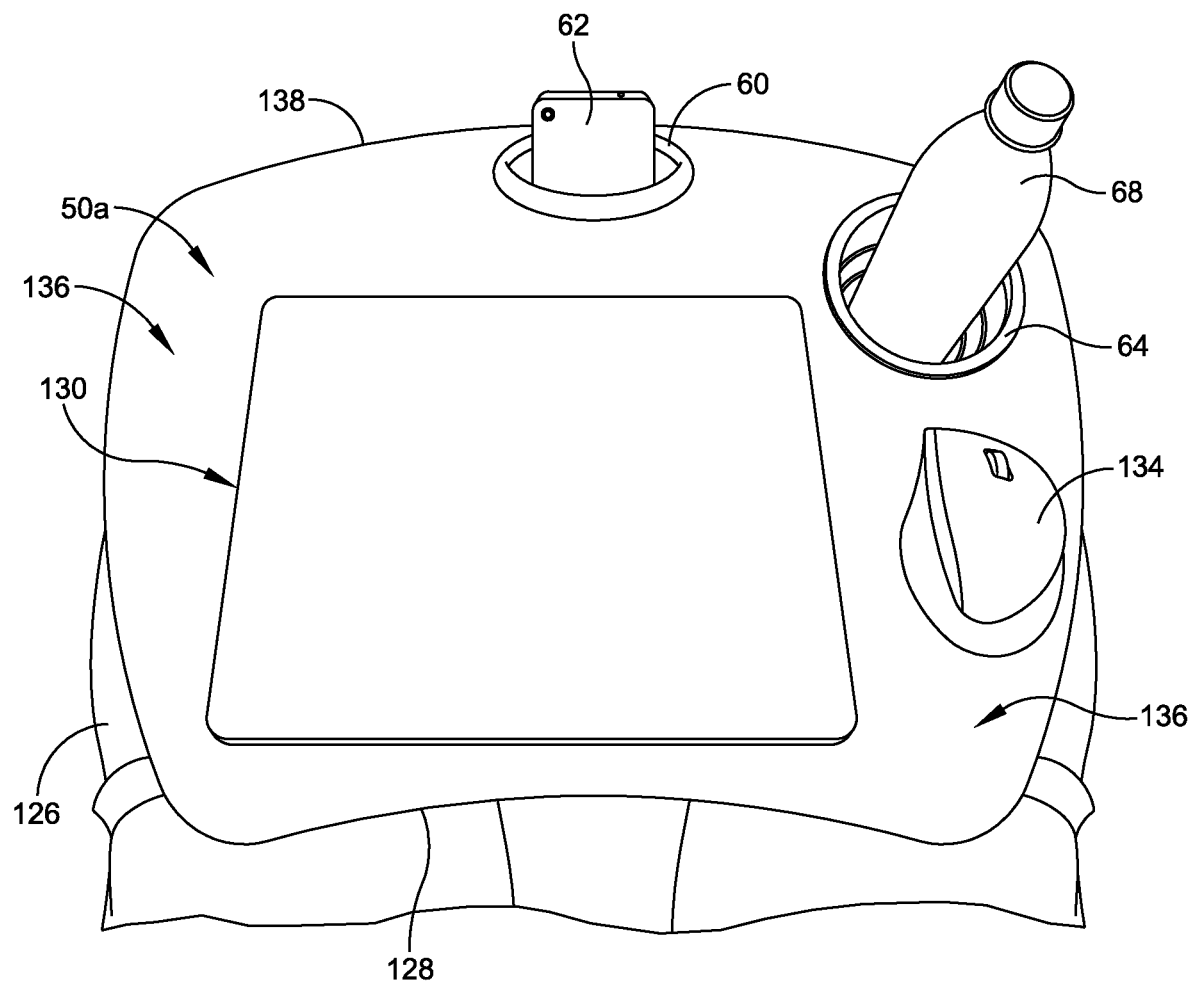
FIG. 8 illustrates a mock-up of a horizontal platform configured as a smart media desk, in accordance with an embodiment of the present disclosure.

The version of the lapdesk 50a shown in FIG. 8 provides a concave desk edge 128 to allow the lapdesk 50a to conform more closely to a user's torso (not labelled). It is to be understood that, although not shown, the bottom side of the lapdesk 50a may be configured to releasably carry a cushion (e.g., via a Velcro (hook and loop) fastener, snap-fit fastener, etc.) to improve the comfort of the user and to help the lapdesk 50a to stay in place on a user's lap 126. In another variant, such a cushion could be permanently attached to the bottom of the lapdesk 50a.

In embodiments that may not be expressly shown, a horizontal platform 50 disposed with one or more collapsible basins 64 and/or flexible pockets 60 may be removed from suspension by a bed 70 or furniture and utilized as a lapdesk 50a, being positioned on a user's lap 126 for eating (not shown) or for working on a laptop 130 or with other electronics (not shown). As a computer work platform, the lapdesk 50a may function as a Smart Media Desk holding a laptop 130 and/or other electronics (e.g., smart phone, iPad, etc.). The bottom of the horizontal platform may be disposed with a bottom rest (not shown) comprising a molded or conformable cushion for securely and comfortably resting on the lap/legs 126 of a user. For example, a bottom rest may comprise memory foam, kapok, or buckwheat covered with fabric or leather and shapeable to conform to the lap or legs of a user.

The contour of the horizontal platform 50a, in the form of the concave desk edge 128, may be curved concavely toward the user to provide a better fit to the waist (not labelled) of the user. The platform 50a may be shaped to provide an extended surface or support areas 136 for wrists, a computer mouse, and/or a cup holder. A concave contour 128 fitting the user's waist may be an inner portion 52 of the horizontal shelf 50, 50a normally captured beneath the mattress 54. A collapsible basin 64, such as a collapsible colander or bowl, may be disposed near the edge of the horizontal platform 50, 50a for supporting a drinking glass (not shown) or beverage container 68. A hanging flexible pocket 60 may support a cell phone 62, reading glasses (not shown), or other personal items. Alternately, a collapsible cup holder centrally located (not shown) on the horizontal platform 50, 50a may be configured to recess below the surface for allowing a laptop 130 to rest fully against the platform 50, 50a.

Continuing with potential embodiments that are not expressly shown, the horizontal platform 50, 50a (portable shelf) may also be configured with a foldable box (not shown) removable for utilizing the horizontal platform 50 as a lapdesk 50a. The lapdesk 50a may be sized to accommodate a laptop 130, iPad (not shown), eating utensils (not shown), a cell/smart phone 62, a computer mouse 134, and/or to provide support areas 136 for the wrists (not shown) or for personal items. Additionally, a non-slip grip pad (not shown) may be affixed to the top surface of the horizontal platform to prevent a cell phone or other items from sliding off. In an embodiment not shown, a horizontal platform 50 configured for use as a lapdesk 50a (e.g., eating area, Smart Media Desk) may be mated with a platform housing 104 enclosing the horizontal platform when captured by a mattress and mattress supporting structure. A user desiring to utilize the lapdesk feature of the Smart Shelf lapdesk 50a may remove a horizontal platform 50 supported by releasable guides from the platform housing 104 and may position the horizontal platform on the user's lap. The platform 50 may be rotated by 180 degrees from its captured bed position and used as a lapdesk 50a such that an outer portion 52 being a convex long side 138 may now orient away from the lapdesk user (not labelled).

In an embodiment not shown, a horizontal platform 50 (portable shelf) functioning as a lapdesk 50a may be used as an eating tray or function as a smart media desk and may be may be rotated by 90 degrees from its captured bed position and used as a lapdesk 50a with the width PW of the platform 50 aligned with the lap/legs 126 of a user. A collapsible basin 64 mounted to a basin hole 76 may support a beverage container 68, and a flexible pocket 60 mounted to a pocket hole may support a cell phone. It is to be understood that the basin hole 76, in any of the variants shown for the platform 50/lapdesk 50a, could serve directly as a drink cup holder in an instance where the drink cup is wider in diameter at the top than at the bottom (i.e., has a tapering diameter so as to prevent the drink cup from passing through the receiver hole).

Figure 9:
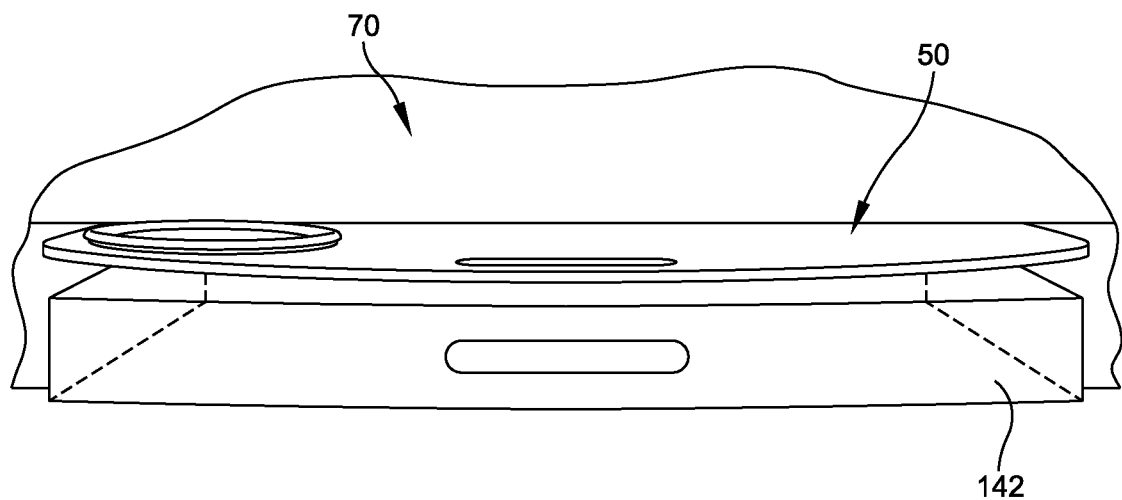
FIG. 9 illustrates a sliding drawer compartment mounted and/or supported underneath at least the outer portion of the shelf.
Figure 10:
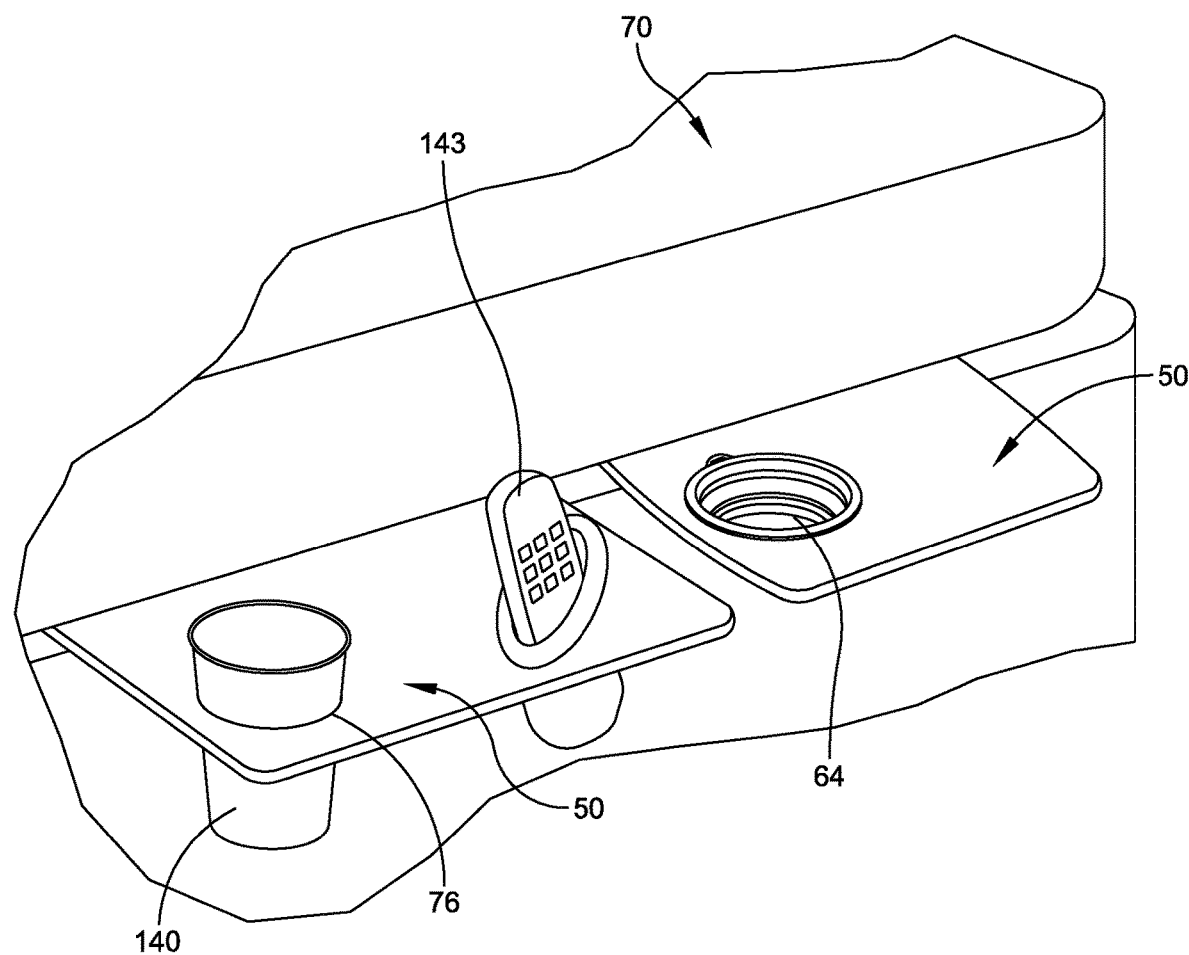
FIG. 10 illustrates a mock-up of a pair of horizontal platforms being used in conjunction with a bed, in accordance with an embodiment of the present disclosure.
Figure 11:
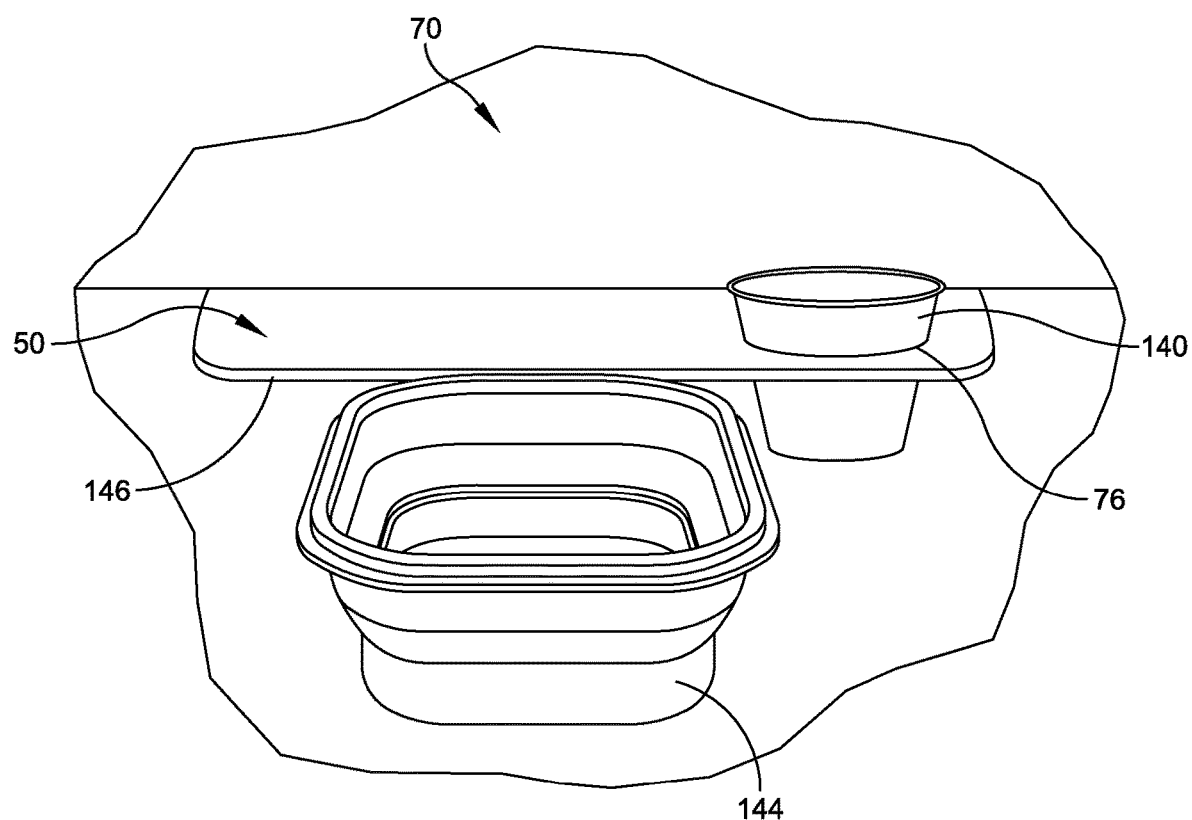
FIG. 11 illustrates a storage container extending from a leading surface of the portable suspended retractable shelf, in accordance with an embodiment of the present disclosure.

With reference to FIGS. 9-14b and some variations that are not expressly shown, there is provided various embodiments of a portable suspended retractable shelf 50 for storing bedside items that has an inner portion 52 that slides under a mattress 70 or cushioned furniture and an outer portion 58 that serves as a shelf. As described above, the inner portion 52 may be configured to be captured between a mattress 54 and a mattress supporting structure 56 like a box springs. The platform 50 may have an outer portion 58 disposed with a flexible pocket 60 for holding a cell phone 62 and a collapsible basin 64 for holding a glass (not shown), beverage container 68, or other items. The inner portion 52 may be sized and dimensioned such that the horizontal platform 50 is securely and frictionally captured while allowing the platform 50 to be slidably retracted into or extended out from the bed 70. In addition to the embodiments disclosed in FIGS. 1-14b, the upward-facing shelf 50 may also use the basin or cutout hole 76 for the collapsible basin 64 as a standalone holder (i.e., direct holder) for cups, glasses, mugs, etc. The hole 76 may be sized both for a given collapsible basin 64 and for holding certain sized cups, bottles, and bedside items. It is to be understood that the collapsible basin 64 need not necessarily have to be just cup-shaped. The collapsible basin 64 may be take on any of a variety shapes (e.g., generally rectangular, oval, etc.), so long as the basin hole 76 matches the item it is to receive and is thus able to hold it in place relative to the horizontal platform 50. Alternatively, the collapsible basin 64 may be removed (or not inserted) to hold larger size receptacles and/or cups (e.g., soft drink cup) 140 (FIGS. 10 and 11) that are designed to be narrower at the bottom and wider at the top. In this manner of configuration, the receptacle or cup 140 may be dropped/placed into the otherwise empty basin or cutout hole 76 and held in place thereby essentially by the portion of the cup 140 larger in diameter than the basin or cutout hole 76. FIGS. 10 and 11 illustrate a cup 140 disposed within the hole 76 in a suspended configuration with a portion of the cup 140 extending through the shelf 50.

With reference to FIG. 9, and in an exemplary embodiment, the same shelf 50 as discussed herein may also offer one or more sliding drawer compartment(s) 142 of various sizes mounted and/or supported underneath the outer portion 58 of the shelf 50. The sliding drawer compartments 142 may open and close from any of the three exposed sides (front, left or right; not labelled) of the outer portion 58 of the shelf 50. The shelf 50 and/or a given drawer compartment 142 may incorporate a handle (not labeled) to aid pulling thereof.

With reference to FIG. 11, and in another exemplary embodiment, there may be provided a storage container 144 extending from a leading surface 146 of the portable suspended retractable shelf 50, with the storage container being releasable attached (e.g., via a clamp) or permanently attached (e.g., via adhesive, threaded fastener, etc.) to that leading surface/edge 146 of the horizontal platform 50. In one embodiment, the storage container 144 may be collapsible to extend downwardly (shown) to hold various items and retract upwardly (not shown) for storage or transport of the portable suspended retractable shelf 50. It is to be understood that the portable shelf 50 may include a corresponding basin hole 76, not shown, sized to accommodate a storage container 144. It is to be understood that various collapsible basins or other collapsible containers are commercially available, and the use of any these sorts of basins or containers within the context generally described is considered to be with the scope of the present system.

Figure 12:
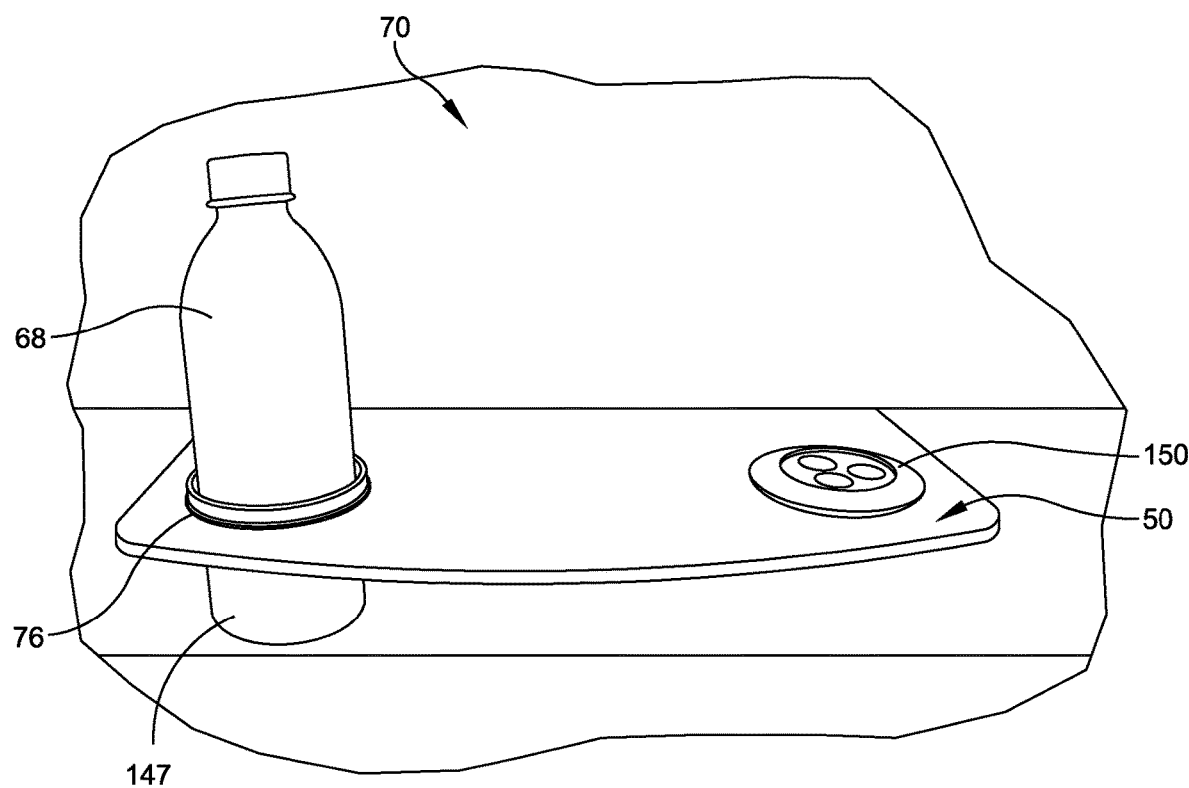
FIG. 12 illustrates a mock-up of a horizontal platform with a retention cup and an LED light carried thereby, with the platform being suspended by a bed, in accordance with an embodiment of the present disclosure.

Referring now to FIG. 12, in an embodiment, a horizontal platform 50 (portable shelf) may provide a storage cup 148 and an LED light 150, each of which may be received in a respectively sized and shaped basin hole 76. The storage cup 148 may be able to hold a beverage container 68 and/or other items (e.g., pens, change, watch, cell phone, etc.). Such a storage cup 148 may be rigid in nature and may be formed of a clear or opaque plastic, among other materials. Each of the storage cup 148 and the LED light 150 may, in one variation, be removably received in their respective basin hole 76 to permit their removal if it is desired to fully retract the platform 50 into the bed 70 if not otherwise possible to do so already. The LED light 150 is a commercially available, battery-powered unit, which, when employed with the platform 50, serves as a source of light at a user's bedside, being able to be used as an aide for preparing for bed and/or as a night light, as desired. Although not shown, it is to be understood that the LED light could instead have a plug and/or a power cord associated therewith for connection to an electrical outlet.

The LED light 150, as one may expect from FIG. 12, would have a first portion (not shown) that is sized and configured to be received in a corresponding basin hole 76 (e.g., a slight friction fit could in fact help keep it in place, but a generally close fit along with gravity may be sufficient as well); and a second portion (not labeled) that is sized and configured so as to be able to rest upon a portion of the horizontal platform 50 (i.e., helping to prevent it from falling through the basin hole 76). Those first and second portions of the LED light 150 help to retain it in place relative to the platform 50, thus providing enough structure to make it removably mounted relative to the platform 50. Although not shown, it is to be understood that a further retention mechanism (e.g., Velcro; releasable or permanent adhesive; magnets; etc.) could be employed with the LED light 150, as well, to help keep it in place.

Figure 13A:
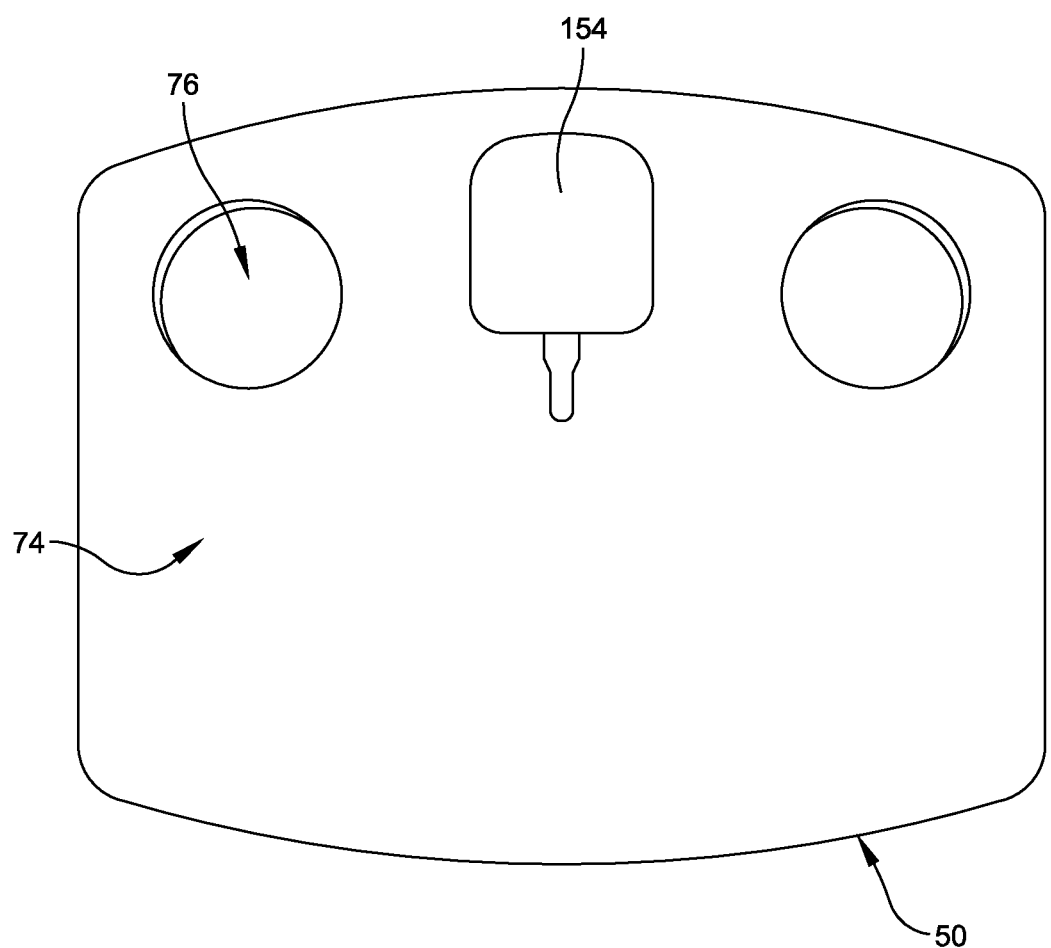
FIG. 13a illustrates a bottom view of a mock-up of a horizontal platform with a formed receiving cavity for carrying a wireless charger, in accordance with an embodiment of the present disclosure.
Figure 13B:
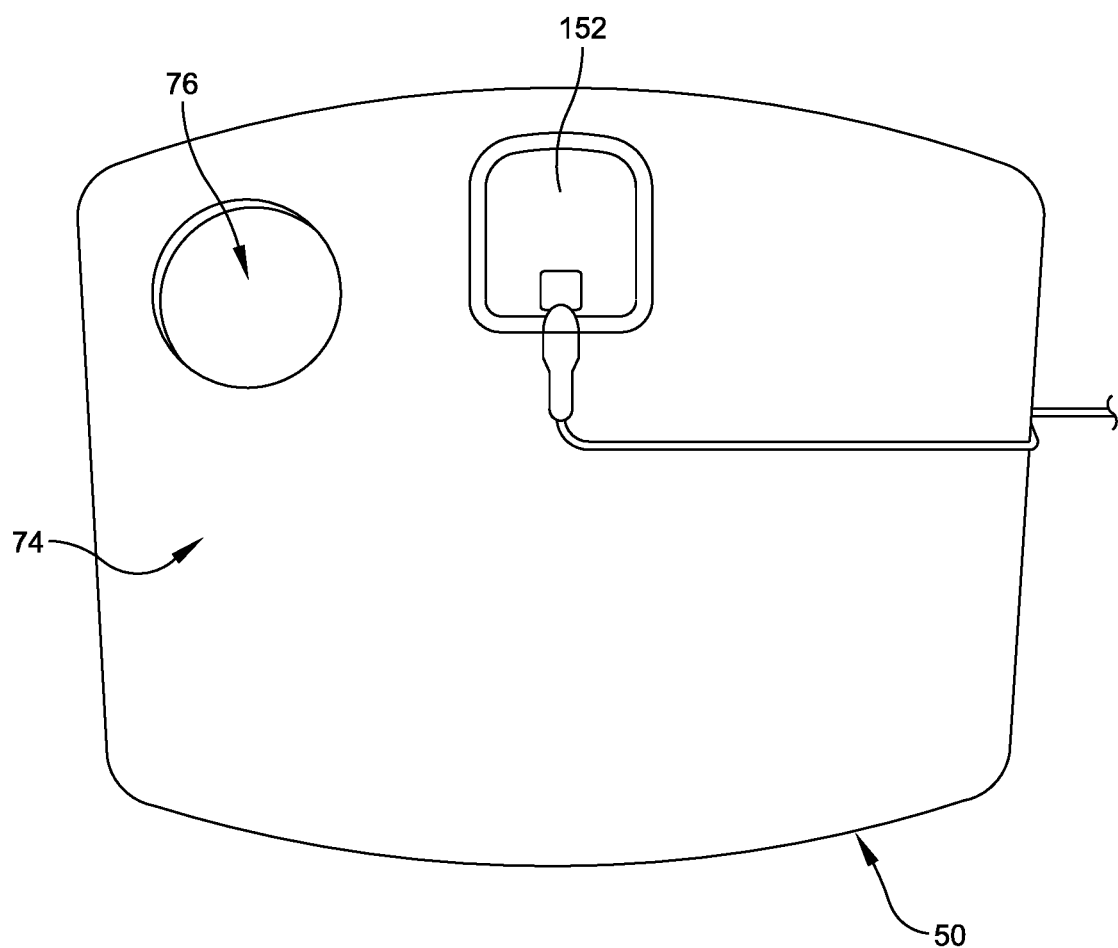
FIG. 13b illustrates the bottom view of the horizontal platform shown in FIG. 13a, with the wireless charger in place within the formed receiving cavity.

Referring now to FIGS. 13*a* and 13*b*, in an embodiment, the platform 50, as part of its outer portion 58, may incorporate on the bottom surface 74 thereof a wireless charger 152. The wireless charger 152 is a commercially available unit (e.g., LG Techtop sold by LG Hausys and Dupont Corian Charging unit), and it facilitates the wireless charging of any various electronic devices which are placed in sufficient proximity thereto (e.g., on the opposed top surface portion (not shown) of the platform 50, relative to the wireless charger 152). In order to make sure that the wireless charger 152 is close enough to the upper/top surface 84 of the platform 50 and to aid retention of the wireless charger 152 relative to the platform 50, a charger receiver portion 154 may be formed (e.g., by routing, molding, surface mounted, etc.) within the bottom surface 74 of the platform 50. The charger transmitter/receiver portion 154 should be integrated enough such that the intervening platform material does not attenuate the wireless charging signal to a degree that the charging becomes inefficient. The configuration (e.g., depth and/or closeness of fit) of the charger receiver portion 154 may be sufficient to hold the corresponding wireless charger 152 in place, but it is to be understood that a supplemental attachment mechanism (e.g., Velcro (hook and loop) fastener, threaded fastener, adhesive, etc.) could be employed to help hold the wireless charger 152 in place. In addition, the storage cup 64 or the drink cup 148 may integrate electrical wiring (or other wireless or charging mechanisms, including, for example, wireless (magnetic inductive, near field radio frequency, RF chip and magnetic resonance charging mechanisms) supplying AC/DC or USB power to electrical devices being stored within or the bottom surface or integrated into the material of storage cup 64 or the drink cup 148 installed in basin hole 76.

Figure 14A:
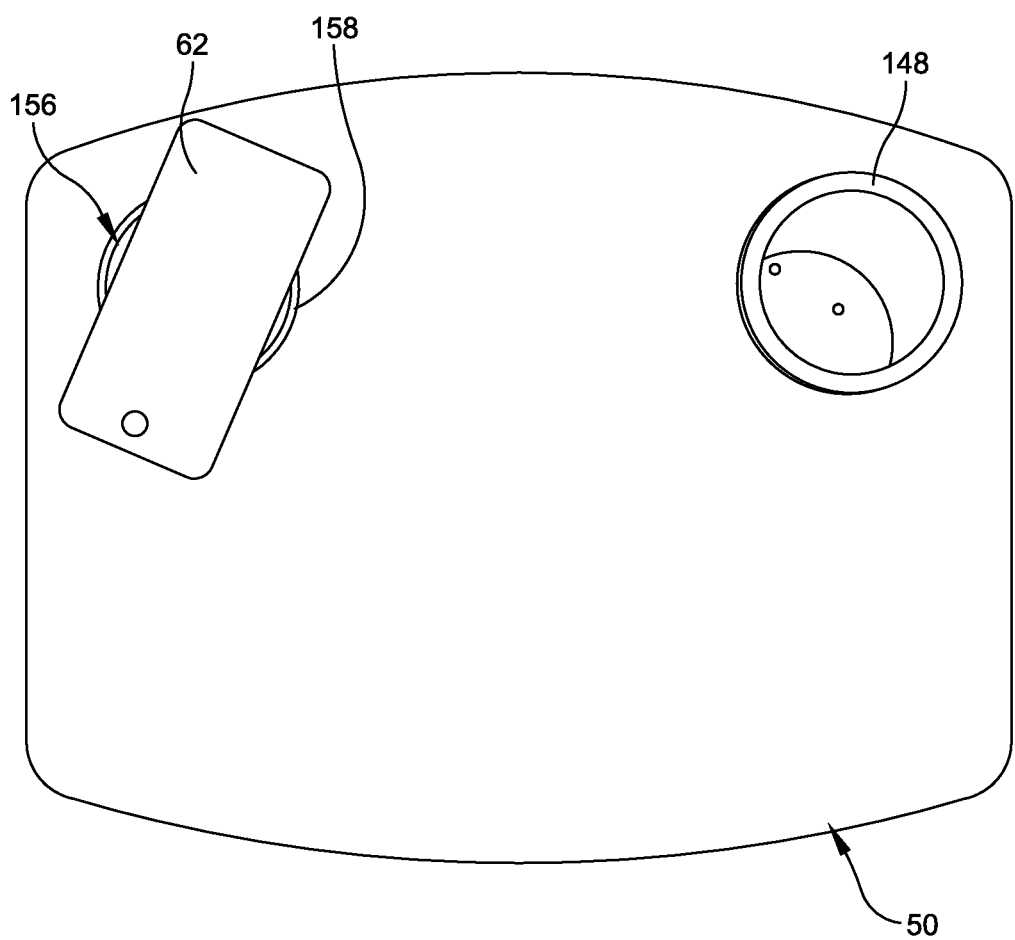
FIGS. 14a and 14b illustrate a mock-up of a horizontal platform with an electronics charger unit carried thereby, in accordance with an embodiment of the present disclosure.
Figure 14B:
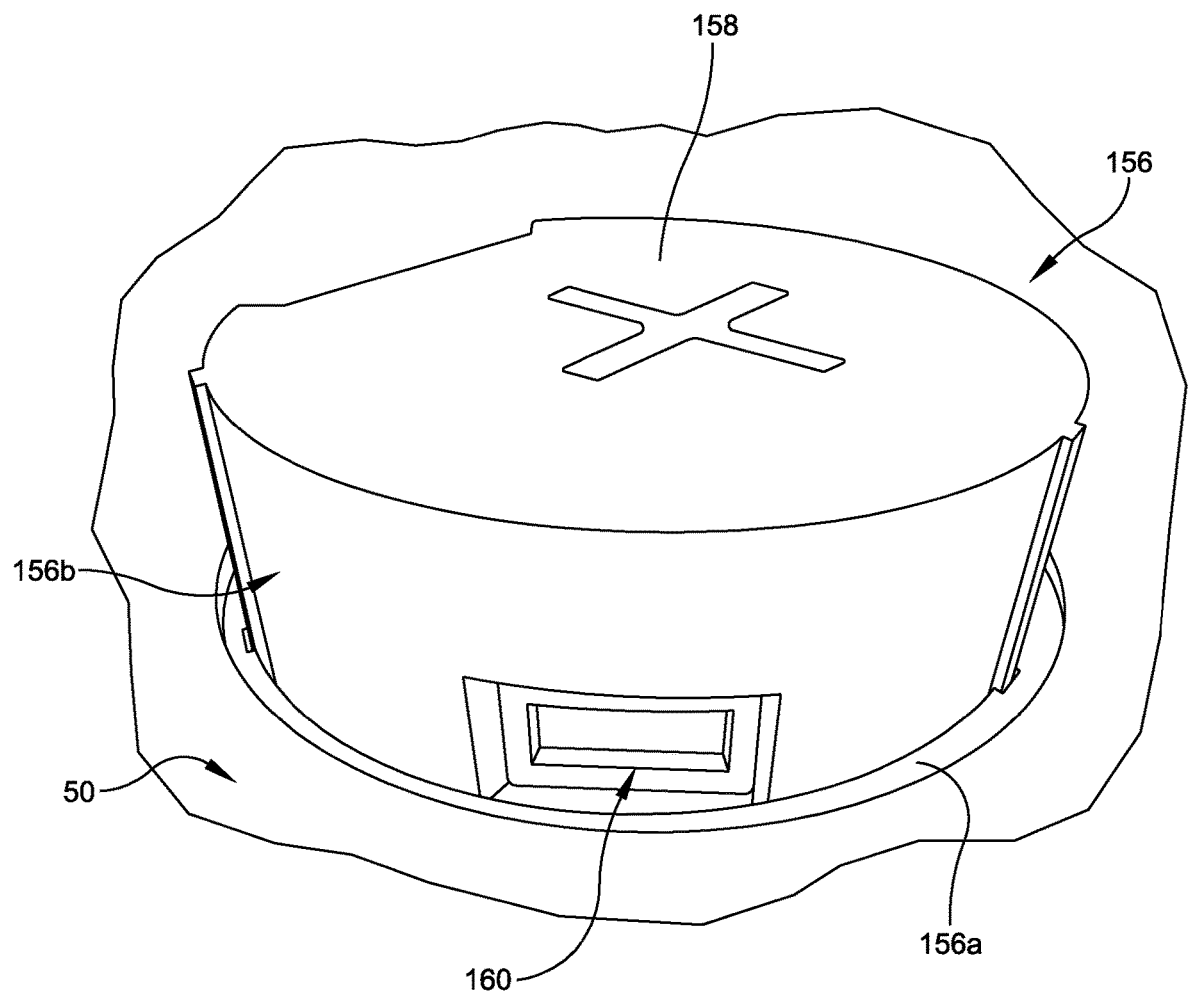

Referring now to FIGS. 14*a*-14*b*, in an embodiment, the platform 50, as part of its outer portion 58, may include at least a pair of basin holes 76, one of which may be occupied by a charger port 156 (a commercially available unit) and another occupied, for example, by a storage cup 148. The charger port 156 includes a port mounting portion 156*a* that is sized and configured to be received and held within a corresponding basin hole 76 via the surrounding top side 84 of the platform 50. The charger port 156 includes a port power-source portion 156*b* carried by the port mounting portion 156*a*, and the port mounting portion 156*a* and the port power-source portion 156*b* may define a slide fit connection 158 therebetween. The port power-source portion 156*b* may provide a top wireless charge surface 158 (the wireless charging unit being hidden below it and within the port power-source portion 156*b*) and at least one USB outlet 160 therewith at location below the top wireless charge surface.

The port power-source portion 156*b*, via its slide connection with the port mounting portion 156*a*, may be selectively deployed in a down position flush with the top side 84 of the platform 50, able to receive a cell phone 62 or other electronic device thereon (FIGS. 14*a* and 14*b*) or in an up position protruding above that top side 84, thereby exposing the USB outlet 160 for use (FIG. 14*b*). The charger port 156 may employ a power cord (not shown) to allow connection with a wall or other outlet (not shown) or may instead be provided with batteries (not shown).

In an embodiment not shown, the platform 50, as part of bottom side 74 of its outer portion 58, may carry a multi-plug outlet with a power cord, with standard outlets or electrical sockets (e.g., 2 or 3 prong; international-style electrical sockets; etc.) and/or USB outlets 160 potentially available. It is to be understood that such a multi-plug outlet cord could be permanently and/or releasably attached to the bottom side 74 of the platform 50, as desired.

Figure 15A:
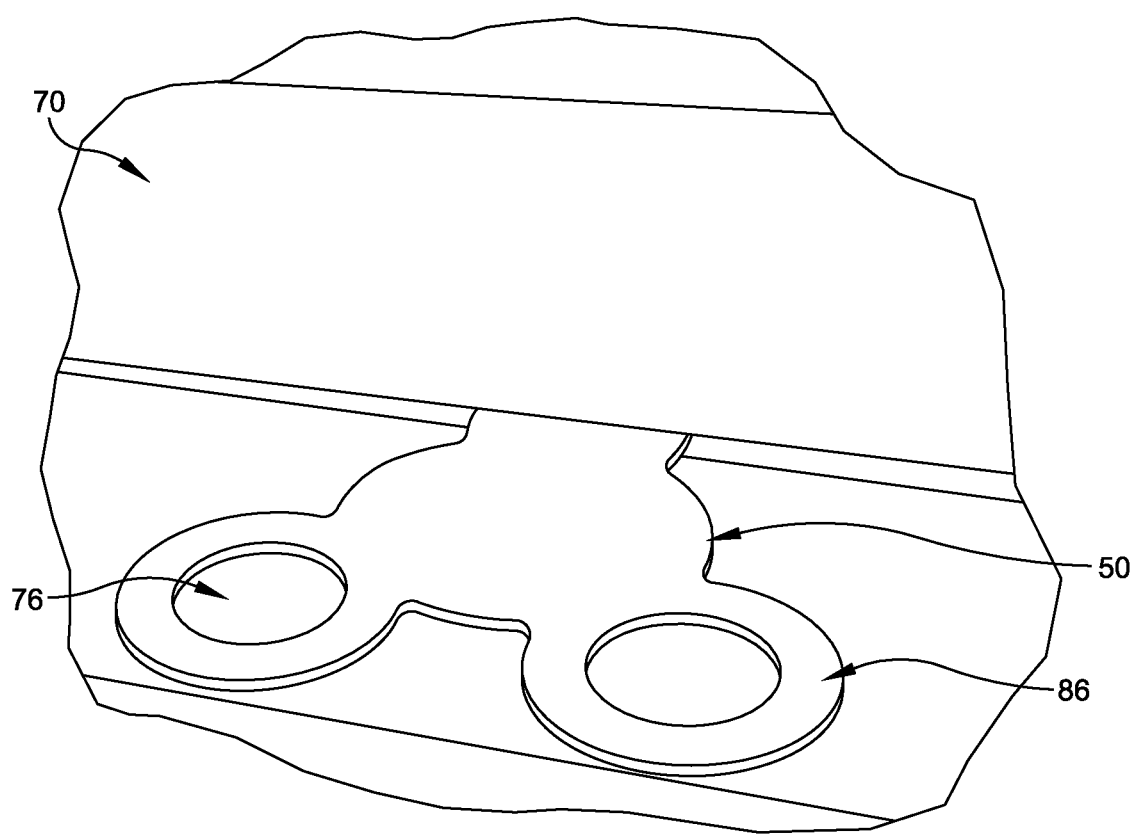
FIGS. 15a and 15b illustrate a mock-up of a horizontal bed platform or cushion furniture shaped and/or otherwise designed to portray a known character, in accordance with an embodiment of the present disclosure, and the character shelf could be used on cushion furniture.
Figure 15B:
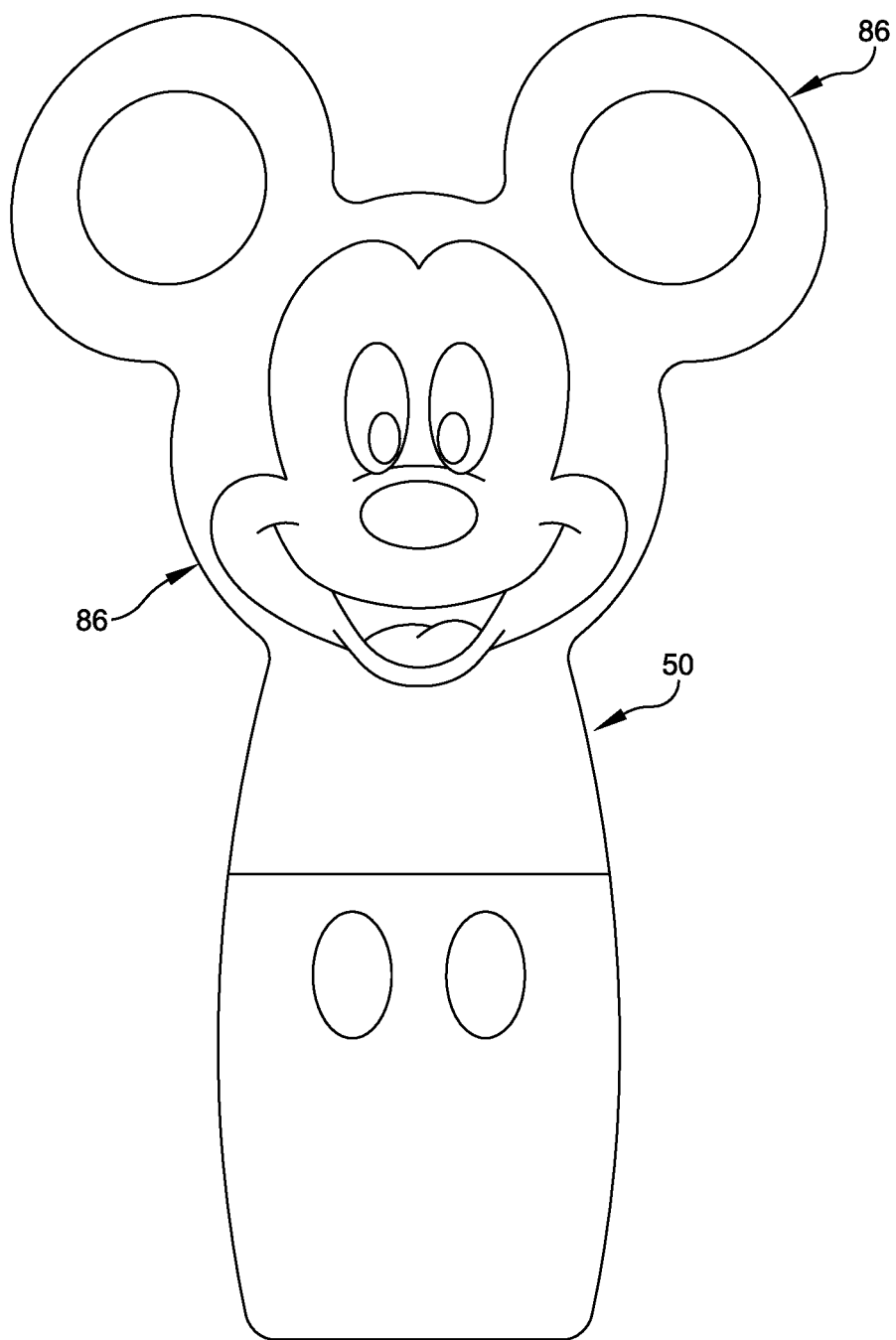

Referring now to FIGS. 15*a*-15*b*, in an embodiment, the platform 50 may be configured, in shape, decoration, color schemes, logos, or other means, to signify a character, a school, a college, a university, a team, a group, an organization, a business, or some other known entity (e.g., via trademarking). Per the illustrated example, the shape of the horizontal platform 50 may mimic a cartoon character or other figure (FIGS. 15*a*-15*b*, where, for example, Mickey Mouse (Walt Disney Co.) is depicted), wherein some recognizable feature 86 of the figure, such as the ears, may align with an aspect of the portable shelf 50, such as a location (e.g., a pocket hole 74 and/or basin hole 76) for receiving a collapsible cup holder or another receiver element. Other recognizable features 86 (e.g., facial and/or other known characteristics) may provide further design aspects associated with the character. In the particular instance, Mickey Mouse is depicted, but it is meant to be exemplary only and by no means limiting in the range of uses per this embodiment. It is to be understood that the platform 50, in the context of this embodiment, could readily be used for entertainment (e.g., depicting a cartoon character) and/or for advertising (e.g., hotel branding) purposes. It is to be understood that the recognizable feature 86 may or may not serve an additional functional aspect, as can be seen from the "Mickey Mouse" example shown here.

Figure 16A:
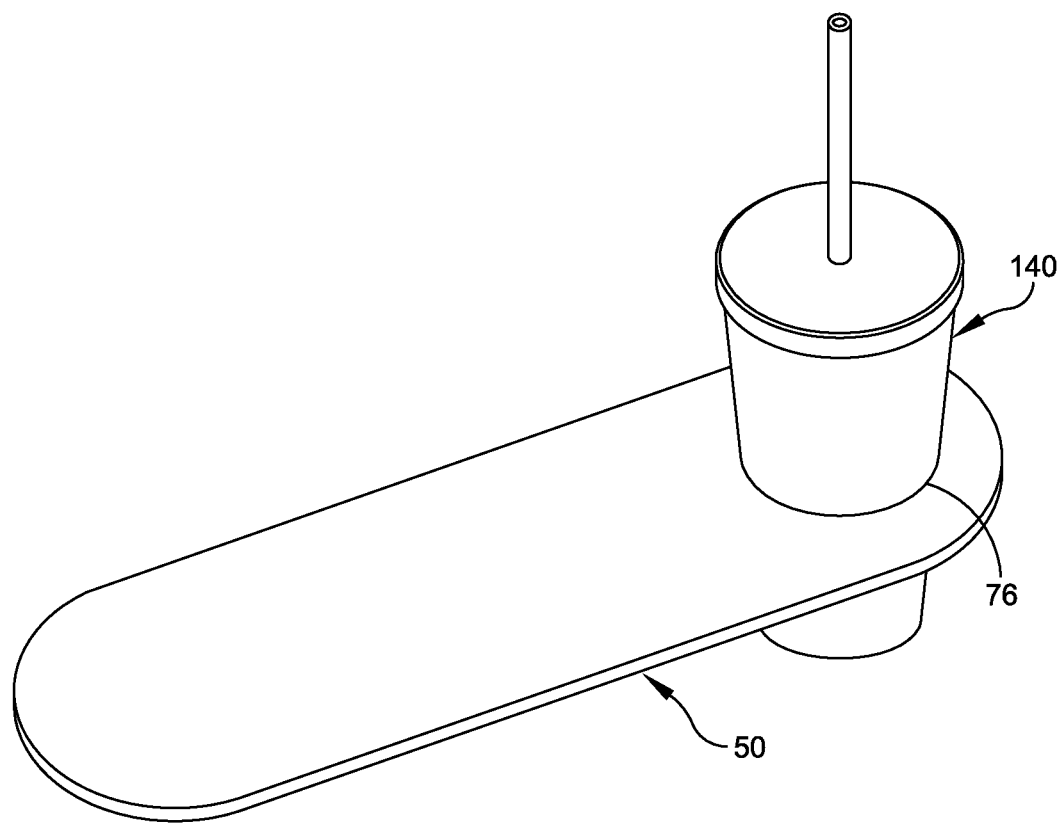
FIGS. 16a and 16b illustrate a mock-up of a horizontal drink holder platform configured for suspension from a bed, couch or a chair, in accordance with an embodiment of the present disclosure.
Figure 16B:
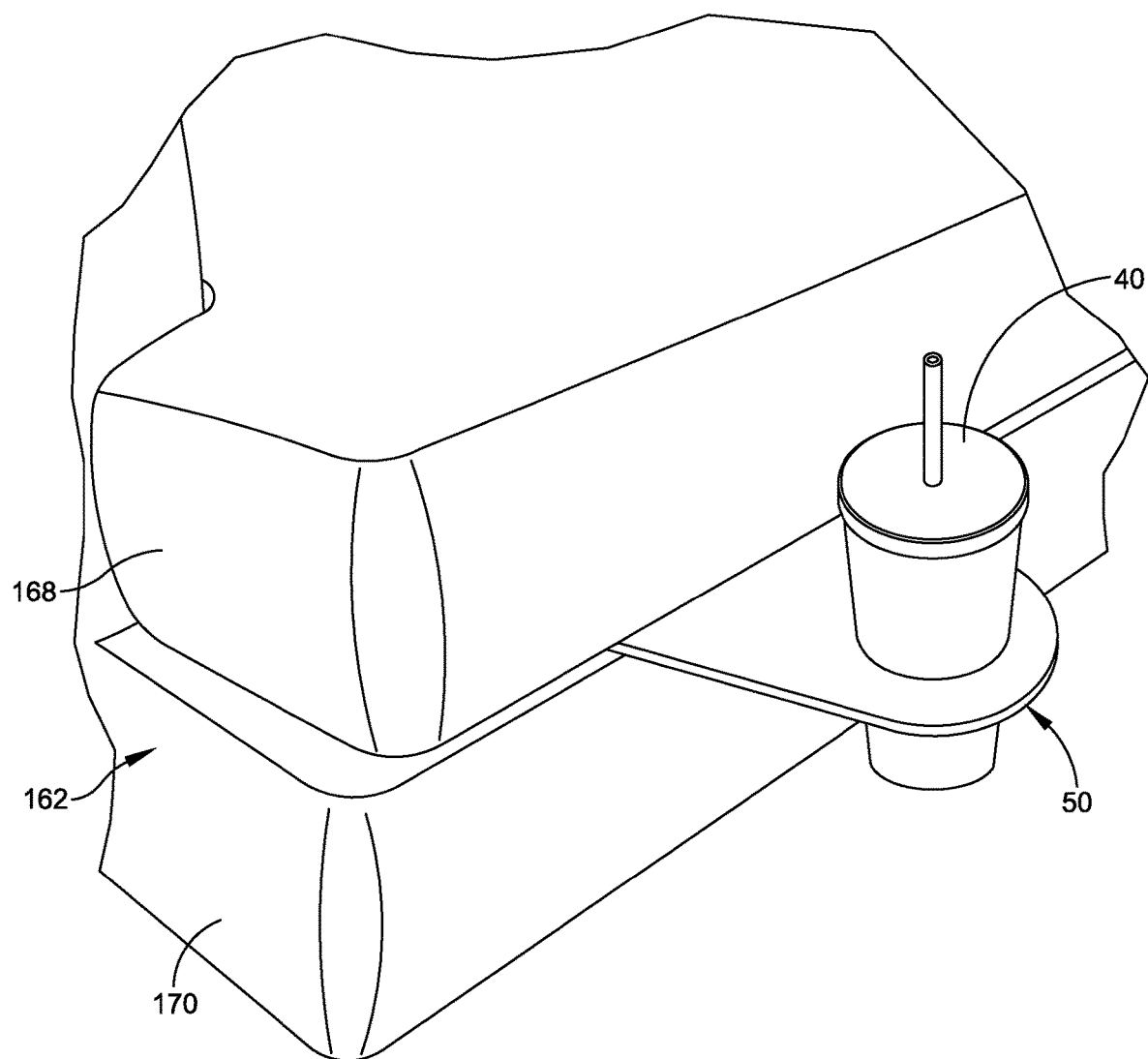

Referring now to FIGS. 16*a*-16*b*, in an embodiment, the platform 50 may be used in conjunction with other cushioned furniture, such as, by way of example only, a couch 162, as shown in FIG. 16*b*, or a patio or lounge chair (not shown). In the illustrated variant, the platform 50 may be in the form of a narrow plank with at least one basin hole 76 for directly or indirectly (e.g., via a collapsible basin 64 or a storage cup 148, not shown here) carrying, for example, a cup 140, a glass (not shown), or beverage container 68 therein. The platform in the form of the plank 50 may be made of any various materials as suggested for other forms of the platform 50 and should be wide (e.g., 4 inches or more) enough to serve (in terms of both area and strength) as a carrying space for one or more remote controls, beverages, or the like, but may also be limited in its width (e.g., 7 inches or less), so as to not interfere substantially with the amount of room available for the legs of the one or more users of the given piece of furniture. That said, it is also be understood that, especially where a larger couch 162 is involved, a wider platform 50 could be employed so as to allow more items to be carried on or by the platform 50.

Similar to the means used to support a platform 50 within the bed 70, an inner portion 52 of the platform 50 is inserted between and thereby supported by an upper cushion member 168 (akin to a mattress 54 in the context of the bed 70) and a lower cushion support member or furniture base 170 (akin to the mattress supporting structure or box springs 56). Thus, in terms of the current and previous examples, the upper cushion member 168 of a given piece of furniture, in the broadest sense, may be any of a mattress or a cushion of a chair or sofa, and lower cushion support member 170 thereof may be in the form of a box spring, a bed frame, a bunk bed board or support, a seat base, a chair base, or a sofa base. That is to say, in prior embodiments, where the bed 70 was the piece of furniture shown, it is to be understood that the mattress 54 served as the upper cushion member 168 and the mattress supporting structure 56 served as the lower cushion support member 170.

Figure 17:
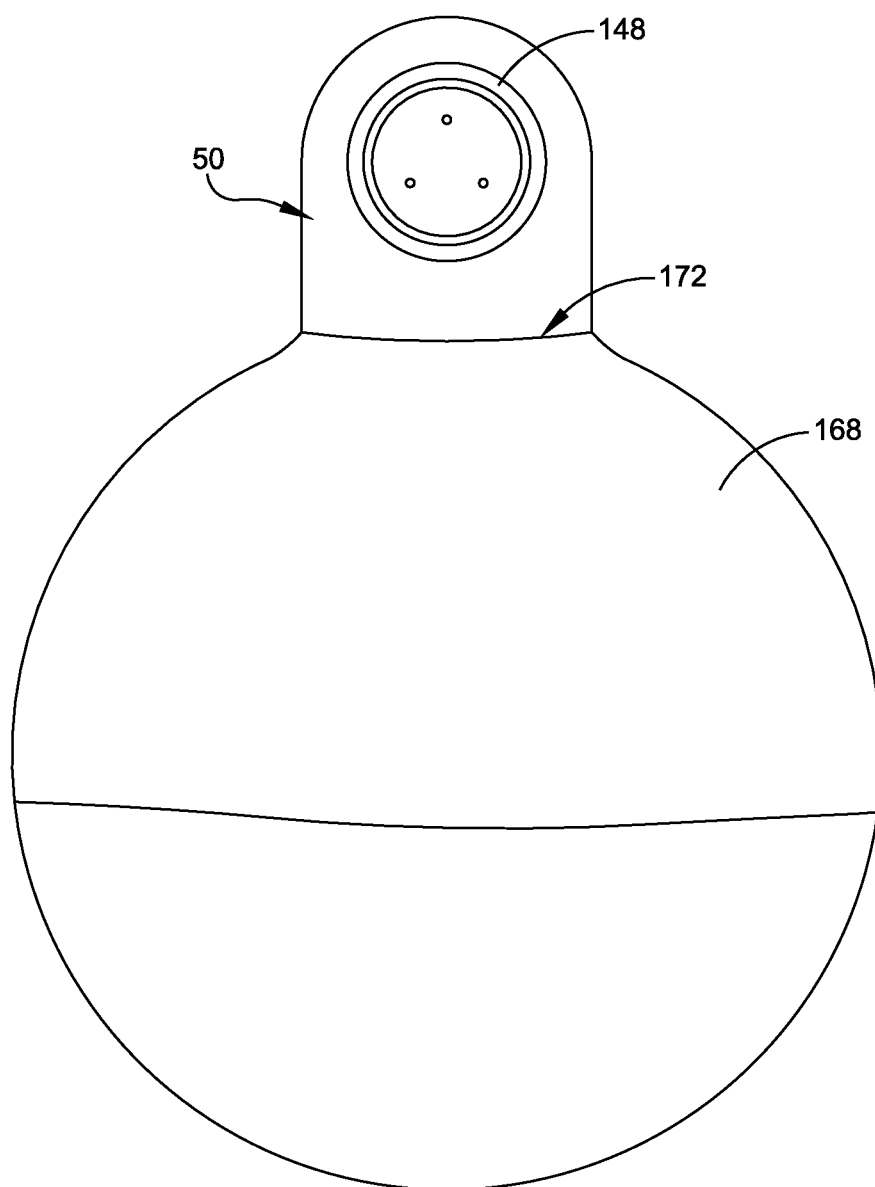
FIG. 17 illustrates a mock-up of a horizontal drink holder platform carried within a portable seat cushion.

Referring now to FIG. 17, in an embodiment, the platform 50 may be configured for use directly within the upper cushion member 168 itself. In the illustrated variant, the upper cushion member 168 may provide a platform receiver opening 172 therein, into which the inner portion 52 (not shown) of the platform 50 may be inserted. In the embodiment shown, the upper cushion member is in the form of a stadium cushion, and the purpose of the lower furniture base 170 could be served, in part, by the part of the cushion below the inner portion 52 (not labelled) and, in part, for example, by an underlying stadium seat, bleacher, or set of stands (not shown). It is to be understood that the platform 50 may provide the capacity to carry one or more drinks or other items (e.g., directly or indirectly via a basin hole 76) and that the inner portion 52 of the platform 50 may be permanently affixed within the upper cushion member or be removably inserted therein.

The foregoing description of the subject matter has been presented for purposes of illustration and description. It is not intended to be exhaustive or to limit the subject matter to the precise form disclosed, and other modifications and variations may be possible in light of the above teachings. Further, it is to be understood that the various features described herein may be used in combination with one another, even if not expressly stated or shown being used in combination. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A portably suspended retractable shelf for storing items proximate to a piece of furniture, comprising:
    a horizontal platform having an inner portion and an outer portion, the inner portion including a mounting bracket adapted to mount the horizontal platform to a trim board that is positioned adjacent an upper cushion member and a lower cushion support member of the piece of the furniture; and
    at least one of the following disposed on the outer portion of the horizontal platform and accessible to a user on the upper cushion member: a cutout hole configured to hold a cup therethrough, a collapsible basin, a hanging flexible pocket, a foldable box, a storage cup, and a drink cup.

2. The portable shelf of claim 1, wherein the collapsible basin, the hanging flexible pocket, the foldable box, the storage cup, and the drink cup are at least one of removable and collapsible for allowing the horizontal platform to be slidably retracted under the upper cushion member.

3. The portable shelf of claim 1, wherein the cutout hole is configured to hold a cup in a suspended configuration through the shelf.

4. The portable shelf of claim 1, further comprising a basin hole in the horizontal platform for mounting one of the collapsible basin and the storage cup, the collapsible basin is one of a colander, a bowl, a cup holder, and a bin, and wherein the collapsible basin is made of one of silicone, an FDA approved food-compliant material, fabric, and mesh screen.

5. The portable shelf of claim 4, wherein the collapsible basin extends beyond a top and a bottom of the outer portion by less than approximately ½ inch when the collapsible basin is vertically collapsed.

6. The portable shelf of claim 1, further comprising a pocket hole in the horizontal platform for mounting the flexible pocket, wherein the hanging flexible pocket is made of at least one of cloth, plastic insert, shear fabric, leather, and collapsible silicone.

7. The portable shelf of claim 6, wherein the flexible pocket extends beyond a top and a bottom of the outer portion by less than approximately ½ inch when the horizontal platform is retracted under the upper cushion member.

8. A portably suspended retractable shelf for storing items proximate to a piece of furniture having an upper cushion member and a lower furniture base, comprising:
    a sliding horizontal platform having an inner portion and an outer portion; and
    a platform housing having a housing outside surface frictionally captured between the upper cushion member and the lower furniture base, the platform housing slidably enclosing the sliding horizontal platform for retraction and extension of the sliding horizontal platform.

9. The portable shelf of claim 8, further comprising at least one of the following disposed on the outer portion of the sliding horizontal platform and accessible to a user on the upper cushion member: a cutout hole configured to hold a cup therethrough, a collapsible basin, a hanging flexible pocket, a foldable box, a storage cup, and a drink cup.

10. The portable shelf of claim 9, wherein the collapsible basin, the hanging flexible pocket, the foldable box, the storage cup, and the drink cup are at least one of removable and collapsible for allowing the sliding horizontal platform to be slidably retracted under the upper cushion member.

11. The portable shelf of claim 8, wherein the piece of furniture is a bed having a mattress as the upper cushion member and a mattress supporting structure as the lower furniture base.

12. A portably suspended shelf for storing items proximate to a piece of furniture having an upper cushion member, comprising:
    a horizontal platform having an inner portion and an outer portion;
    a platform housing having a housing outside surface frictionally captured by the upper cushion member, the platform housing slidably enclosing the horizontal platform for retraction and extension such that in a retracted position the inner portion and the outer portion of the horizontal platform are slidably enclosed within the platform housing and in an extended position the outer portion of the horizontal platform extends outward from the upper cushion member; and
    at least one of the following disposed on the outer portion of the horizontal platform and accessible to a user on the upper cushion member: a cutout hole configured to hold a cup therethrough, a collapsible basin, a hanging flexible pocket, a foldable box, a storage cup, and a drink cup.

13. The portable shelf of claim 12, wherein the upper cushion member provides a platform receiver opening therein, and the platform housing is configured for insertion into the platform receiver opening.

14. The portable shelf of claim 12, wherein the upper cushion member is a stadium cushion.

15. The portable shelf of claim 12, wherein the horizontal platform is configured to be held between the upper cushion member and a supporting seating surface.

16. The portable shelf of claim 15, wherein the supporting seating surface is an underlying stadium seat, a bleacher, or a set of stands.

17. The portable shelf of claim 12, wherein the horizontal platform is configured to carry a drink directly via one of the cutout hole, the collapsible basin, the hanging flexible pocket, the foldable box, the storage cup, and the drink cup.

18. The portable shelf of claim 12, wherein the horizontal platform is configured to carry a drink indirectly via one of the cutout hole, the collapsible basin, the hanging flexible pocket, the foldable box, the storage cup, and the drink cup.

19. The portable shelf of claim 12, wherein the inner portion of the horizontal platform is permanently affixed within the upper cushion member.

20. The portable shelf of claim 12, wherein the inner portion of the horizontal platform is removably inserted within the upper cushion member.

* * * * *